United States Patent [19]

Coville

[11] Patent Number: 5,696,228

[45] Date of Patent: Dec. 9, 1997

[54] PROCESS FOR PRODUCING SUBSTANTIALLY DRY POLYMER PARTICLES FROM AQUEOUS DISPERSIONS

[75] Inventor: Michael W. Coville, Stamford, Conn.

[73] Assignee: Cytec Technology Corp., Wilmington, Del.

[21] Appl. No.: 723,656

[22] Filed: Oct. 3, 1996

[51] Int. Cl.$^6$ ............................................. C08F 6/24
[52] U.S. Cl. ............... 528/502 E; 528/501; 528/502 R; 528/503; 523/342; 524/423; 524/500; 524/521; 524/555; 524/787; 524/796; 34/26
[58] Field of Search .................. 528/502 E, 499, 528/501, 502 R, 503; 523/342; 524/500, 521, 555; 34/26

[56] References Cited

U.S. PATENT DOCUMENTS

| | | | |
|---|---|---|---|
| 3,208,965 | 9/1965 | Kuhne | 528/502 E X |
| 3,234,163 | 2/1966 | Schurz et al. | 260/29.6 |
| 3,677,321 | 7/1972 | Felstead | 528/503 X |
| 4,380,600 | 4/1983 | Hosoda et al. | 524/458 |
| 4,473,689 | 9/1984 | Login et al. | 526/81 |
| 4,522,968 | 6/1985 | Horacek | 524/388 |
| 4,588,508 | 5/1986 | Allenson et al. | 210/708 |
| 4,673,704 | 6/1987 | Flesher et al. | 524/519 |
| 4,699,951 | 10/1987 | Allenson et al. | 525/194 |
| 4,778,836 | 10/1988 | Farrar et al. | 524/35 |
| 4,835,206 | 5/1989 | Farrar et al. | 524/457 |
| 4,929,655 | 5/1990 | Takeda et al. | 524/458 |
| 4,948,872 | 8/1990 | Brulet et al. | 528/503 X |
| 5,006,590 | 4/1991 | Takeda et al. | 524/458 |
| 5,045,587 | 9/1991 | Tanaka | 524/310 |
| 5,130,358 | 7/1992 | Danner | 524/140 |
| 5,213,693 | 5/1993 | McGrow et al. | 210/728 |
| 5,292,793 | 3/1994 | Ramesh et al. | 524/555 |
| 5,330,650 | 7/1994 | Byrne et al. | 210/708 |
| 5,332,506 | 7/1994 | Marble et al. | 210/705 |
| 5,332,507 | 7/1994 | Braden et al. | 210/708 |
| 5,403,883 | 4/1995 | Messner et al. | 524/458 |
| 5,435,922 | 7/1995 | Ramesh et al. | 210/734 |
| 5,466,338 | 11/1995 | Pearson | 162/168.2 |
| 5,480,934 | 1/1996 | Messner et al. | 524/458 |
| 5,498,678 | 3/1996 | Steffier | 526/200 |
| 5,541,252 | 7/1996 | Schmitt et al. | 524/555 |

FOREIGN PATENT DOCUMENTS

| | | | |
|---|---|---|---|
| 0 170 394 A2 | 2/1986 | European Pat. Off. . | |
| 0 169 674 B1 | 5/1990 | European Pat. Off. . | |
| 0 183 466 B1 | 8/1990 | European Pat. Off. . | |
| 0 479 616 A1 | 4/1992 | European Pat. Off. . | |
| 0 514 649 A1 | 11/1992 | European Pat. Off. . | |
| 0 525 751 A1 | 2/1993 | European Pat. Off. . | |
| 0 573 793 A1 | 12/1993 | European Pat. Off. . | |
| 0 604 109 A2 | 12/1993 | European Pat. Off. . | |
| 0 262 945 B1 | 1/1994 | European Pat. Off. . | |
| 0 595 156 A1 | 5/1994 | European Pat. Off. | B01D 17/04 |
| 0 617 991 A1 | 10/1994 | European Pat. Off. . | |
| 0 624 617 A1 | 11/1994 | European Pat. Off. . | |
| 0 629 583 A2 | 12/1994 | European Pat. Off. . | |
| 0 630 909 A1 | 12/1994 | European Pat. Off. | C08F 2/06 |
| 0 637 598 A2 | 2/1995 | European Pat. Off. . | |
| 0 657 478 A2 | 6/1995 | European Pat. Off. | C08F 220/56 |
| 0 717 056 A2 | 6/1996 | European Pat. Off. . | |
| Sho 52-71392 | 6/1977 | Japan . | |
| 61-138607 | 12/1984 | Japan . | |
| 61-6396 | 1/1986 | Japan . | |
| 61-6397 | 1/1986 | Japan . | |
| 61-6398 | 1/1986 | Japan . | |
| 62-15251 Sho | 1/1987 | Japan . | |
| 62-100548 | 5/1987 | Japan . | |
| 62-262799 | 11/1987 | Japan . | |
| 64-15130 | 1/1989 | Japan . | |
| 2-38131 | 8/1990 | Japan . | |
| Hei 6-25540 | 2/1994 | Japan . | |
| Hei 6-329866 | 11/1994 | Japan . | |
| Hei 7-62254 | 3/1995 | Japan . | |
| WO 95/11269 | 4/1995 | WIPO . | |

OTHER PUBLICATIONS

Journal of Polymer Science: Part A–1, vol. 7, "Salt Effect on Polymer Solutions," Shuji Saito, Momotani Juntenkan, Ltd., Mlnatoku, Osaka, Japan, pp. 1789–1802.

Polymer Bulletin 16,(1986), Springer–Verlag 1986, Minodora Leca, pp. 537–543.

Macromolecules, vol. 5, No. 1, Jan.–Feb. 1972, Novel Polyelectrolytes, "Solution Properties of Novel Polyelectrolytes," D. Casson and A. Rembaum, pp. 75–81.

Journal of Applied Polymer Science, vol. 52, "Aqueous Solution Properties of Poly (Trimethyl Acrylamido Propyl Ammonium Iodide [Poly(TMAAI)]," Wen–Fu Lee and Chan–Chang TSAI pp. 1447–1458 (1994).

Journal of Polymer Science (1994): Part B: Polymer Physics, vol. 32, "Association of Hydrophobic Counterions in Aqueous Solution of Poly (allylammonium) chloride: Comparison Between p–n–Propylbenzenesulfonate and p–iso–Propylbenzenesulfonate Ions,"Tomoyuki Itaya, Hiroshi Ochiai, Tsuyoshi Aoyama, Kazukoshi Ueda, and Akira Imamura, pp. 171–177.

Macromolecules 1993, 26, 6021–6026, "Stacking Interaction of Naphthalenesulfonate Ions around Poly (allylammonium) Cation," Tomoyuki Itaya, Hiroshi Ochiai, Kazuyoshi Ueda, and Akira Imamura.

Macromolecules 1991, 24, 1123–1127, "Effects of Hydrophobic Hydration on Counterion Binding of Polycations," Mitsuru Satoh, Eiji Yoda and Jiro Komiyama.

Chemical Engineering Progress, Apr. 1996, "Successfully Use Agglomeration for Size Enlargement," Wolfgang Pietsch, pp. 29–45.

Power and Bulk Engineering, Feb. 1996, "Speeding up continous mixing agglomeration with fast agitation and short residence times", Peter Koenig, pp. 67–84.

*Primary Examiner*—Fred Teskin
*Attorney, Agent, or Firm*—Claire M. Schultz

[57] ABSTRACT

Aqueous dispersions of cationic water-soluble polymers are provided, as well as processes for making and methods of using the same.

20 Claims, No Drawings

PROCESS FOR PRODUCING SUBSTANTIALLY DRY POLYMER PARTICLES FROM AQUEOUS DISPERSIONS

BACKGROUND OF THE INVENTION

This invention relates to aqueous dispersions comprised of water-soluble polymers, processes for making said dispersions, and methods of using said dispersions in water treating, dewatering, water clarification, papermaking, oil field, soil conditioning, food processing, mineral processing, and biotechnological applications.

U.S. Pat. No. 4,380,600 discloses a process for producing an aqueous dispersion of water-soluble polymers. The aqueous dispersion may contain inorganic salt. However, the aqueous dispersions exemplified therein have disadvantageously high bulk viscosities.

U.S. Pat. No. 4,673,704 and EP 0 170 394 A2 disclose products comprised of particles above 20 microns in size of a high molecular weight polymer gel interconnected by a continuous phase that is an aqueous solution of an equilibrating agent that holds the water content of the particles in equilibrium with the water content of the aqueous phase and that prevents substantial agglomeration of the particles in the fluid product. Although these references are entitled "Aqueous Polymer Dispersions," the products disclosed therein are distinguished from the aqueous dispersions of U.S. Pat. No. 4,380,600 and from the aqueous dispersions of the instant invention in that the particles of U.S. 4,673,704 and EP 0 170 394 A2 are not generally held suspended in a continuous matrix of the aqueous phase but instead generally rest substantially in contact with one another but slide over one another. A process for dispersing the polymer gel into an aqueous solution of an equilibrating agent and working the polymer while in that medium is disclosed in U.S. Pat. No. 4,778,836 and EP 0 169 674 B1. Also, U.S. Pat. No. 4,522,968 discloses a process for dispersing certain powdered water-soluble homopolymers or copolymers in an aqueous solution containing a polymer of ethylene oxide and/or propylene oxide.

U.S. Pat. Nos. 4,929,655 and 5,006,590 disclose processes for preparing aqueous dispersions of water-soluble polymers by polymerizing benzyl-containing monomers in the presence of an organic high molecular multivalent cation and a multivalent anionic salt. The benzyl group-containing monomer may be replaced by a hydrophobic alkyl group-containing monomer as in EP 0 525 751. Numerous references concern these and similar polymers, e.g. U.S. Pat Nos. 5,332,506; 5,332,507; 5,330,650; 5,292,793, 5,435,922; 5,466,338; EP 0 595 156 A1; EP 0 630 909 A1; EP 0 657 478 A2; EP 0 629 583 A2; EP 0 617 991 A1, EP 0 183 466 B1, EP 0 637 598 A2; EP 0 717 056 A2; JP 61-6396; JP 61-6397; JP 61-6398; JP 62-262799; JP 64-15130; JP 2-38131; JP 62 15251; JP 61-138607; Hei 329866; and JP 62-100548. Although some of the aqueous dispersions in these references have relatively low bulk viscosities, the need to include special monomers containing aromatic or hydrophobic alkyl groups in order to render the polymer insoluble in salt solution may be disadvantageous because the special monomers may be expensive and dilutive of the polymer effect in a specific application.

The effect of salts on the solubility of various substances in aqueous solution is well discussed in the scientific literature. The "Hofmeister" series ranks anions according to their ability to increase or decrease the solubility of substances in water. Although positions in the ranking may vary slightly, depending on the substance, a generally accepted ranking of the anions is:

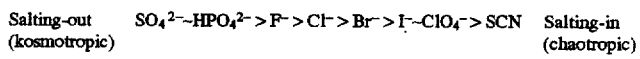

Salting-out (kosmotropic) $SO_4^{2-} \sim HPO_4^{2-} > F^- > Cl^- > Br^- > I^- \sim ClO_4^- > SCN^-$ Salting-in (chaotropic)

Kosmotropic salts generally decrease the solubility of substances in water. For instance, the Hofmeister ranking apparently guided the choice of salts for precipitating cationic water soluble polymers, containing hydrophobic groups, in U.S. Pat. Nos. 4, 929,655 and 5,006,590, as well as EP 0 630 909 A1, EP 0 525 751 A1, and EP 0 657 478 A2, as evidenced by their use of strongly kosmotropic salts containing sulfate and phosphate anions. On the other hand, chaotropic salts generally increase the solubility of substances in water.

There are numerous means known to those skilled in the an for determining whether a particular salt is kosmotropic or chaotropic. Representative salts which contain anions such as sulfate, fluoride, phosphate, acetate, citrate, tartrate and hydrogenphosphate are kosmotropic. Representative salts which contain anions such as thiocyanate, perchlorate, chlorate, bromate, iodide, nitrate and bromide are chaotropic. The chloride anion is generally considered to be at about the middle of the Hofmeister ranking, being either weakly chaotropic or weakly kosmotropic, depending on the particular system. In the instant invention, although occasionally chaotropic, inorganic salts which contain the chloride anion tend to be kosmotropic.

Small amounts of sodium thiocyanate, for instance about 0.1% by weight, on total, have been reported to be useful as stabilizers for polymer dispersions as in EP 0 657 478 A2, where $(NH_4)_2SO_4$ was used to deposit the polymer. Sodium thiocyanate and sodium iodide have been reported to be useful as stabilizers for hydroxylamine-containing water-soluble soluble polymer systems, as in EP 0 514 649 A1. U.S. Pat. No. 3,234,163 teaches that small amounts of thiocyanate salts, preferably 0.1 to 1 percent, based on the weight of the polymer, are useful for stabilizing polyacrylamide solutions.

The Hofmeister ranking has been observed in solutions of high molecular weight, water-soluble polymers. For instance, the effect of various salts on the solubility of synthetic, water-soluble polymers was explored by Shuji Saito, J. Polym. Sci.: Pt. A, Vol. 7, pp. 1789–1802 (1969). This author discussed the effect of various anions on polymer solubility and stated "This anionic order seems to be independent of the type of counter cations and is in line with Hofmeister's lyotropic series for anions." Similarly, in M. Leca, Polymer Bulletin, Vol. 16, pp. 537–543, 1986, the viscosity of polyacrylamide, as determined in 1N solutions of various salts, was found to increase in the order $HPO_4^{2-} < H_2O < Br^- < NO_3^- < I^- = BrO_3^- < ClO_3^- = SCN^-$. The viscosities were reported to be higher in more chaotropic salt solutions than in less chaotropic, or kosmotropic, salt solutions. Certain novel cationic polyelectrolytes, termed ionene polymers, were reported (D. Casson and A. Rembaum, Macromolecules, Vol. 5, No. 1, 1972, pp. 75–81) to be insoluble in either 0.4M potassium iodide or 0.4M potassium thiocyanate. It has also been reported (W-F. Lee and C-C. Tsai, J. Appl. Polym. Sci., Vol. 52, pp. 1447–1458, 1994) that poly(trimethyl acrylamido propyl ammonium iodide) did not dissolve in 0.5M $Na_2ClO_4$ or 0.5M $NaNO_3$.

Certain anionic organic salts, such as hydrotropes and surfactants, also tend to increase the solubility of substances in water. However, poly(allylammonium chloride) was reported (T. Itaya et al., J. Polym. Sci., Pt. B: Polym. Phys., Vol. 32, pp. 171–177, 1994, and references 3, 5 and 6 therein; also Macromolecules, Vol 26, pp. 6021–6026, 1993) to precipitate in solutions containing the sodium salt of p-ethylbenzenesulfonate, p-propylbenzenesulfonate or naphthalenesulfonate. Poly(4-vinyl pyridine) quaternized with butyl chloride and poly(allylammonium chloride) were reported (M. Satoh, E. Yoda, and J. Komiyama, Macromolecules, Vol. 24, pp. 1123–27, 1991 ) to precipitate in solutions of NaI and also in solutions containing the sodium salt of p-ethylbenzenesulfonate, respectively. Compositions comprising sulphonated hydrocarbon surfactants and hydrophilic cationic polymers were disclosed in U.S. Pat. No. 5,130,358. Mixtures of chaotropic salts, or anionic organic salts, and kosmotropic salts may be used to precipitate cationic polymers as in U.S. application Ser. No. (attorney docket No. 96052), fried even date herewith.

Aqueous dispersions of water-soluble polymers are disclosed in U.S. Pat. No. 5,403,883; 5,480,934; 5,541,252; EP 0 624 617 A1; EP 0 573 793 A1; and WO 95/11269. A problem remains in that the aqueous dispersions exemplified in these references still have relatively high bulk viscosities.

A process for preparing crosslinked copolymer beads from water-soluble monomers in an aqueous solution containing an inorganic salt and a dispersant is disclosed in U.S. Pat. No. 5,498,678 and EP 0 604 109 A2. Mixtures of aqueous dispersions and water-in-oil emulsions arc disclosed in Hei 7-62254 and Hei 6-25540. The addition of a nonionic suffactant and an oleaginous liquid to an aqueous dispersion to maintain flowability is disclosed in U.S. Pat. No. 5,045,587. Mixtures of cationic polymers are disclosed in Sho-52-71392 and homogeneous blends of water-soluble polymers are disclosed in U.S. Pat. No. 4,835,206 and EP 0 262 945 B1. Bimodal cationics for water clarification are disclosed in U.S. Pat. Nos. 4,588,508 and 4,699,951. Blends of water-in-oil polymer emulsions are disclosed in U.S. patent application Ser. No. 08/408,743.

In spite of the effort to make satisfactory aqueous dispersions, the problem remains of producing aqueous dispersions of high molecular weight water soluble polymers that have advantageously low bulk viscosities, high active solids content, minimal quantities of dilutive material, and that dissolve readily and can be prepared with a broad range of cationicity.

SUMMARY OF THE INVENTION

This problem is solved in the present invention by providing novel aqueous dispersions of high molecular weight water-soluble or water-swellable polymers, as well as processes for making and methods of using said aqueous dispersions. Accordingly, an aqueous dispersion of polymers is provided which comprises: (a) a first cationic water-soluble or water-swellable polymer; and (b) at least one second water-soluble polymer different from said first polymer; and (c) a kosmotropic salt; and (d) a chaotropic salt, wherein the amounts of said (b), (c) and (d) are such that a homogeneous composition is obtained in the absence of said (b). In another embodiment, an aqueous dispersion of polymers is provided which comprises: (a) a fast cationic water-soluble or water-swellable polymer; and (b) at least one second water-soluble polymer different from said first polymer; and (c) a kosmotropic salt; and (d) an anionic organic salt, wherein the amounts of said (b), (c) and (d) are such that a homogeneous composition is obtained in the absence of said (b).

In another embodiment, an aqueous dispersion of polymers is provided which is comprised of (a) a discontinuous phase containing polymer that is comprised predominately of a first cationic water-soluble or water-swellable polymer having at least one recurring unit of the formula (I),

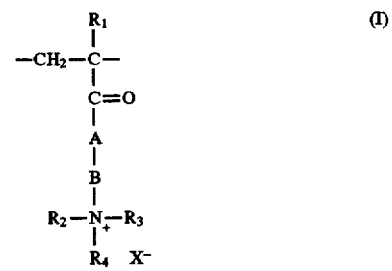

wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is a methyl, ethyl or propyl group, X is a counterion, and $R_2$, $R_3$, and $R_4$ together contain a total of at least 4 carbon atoms; and (b) at least one second water-soluble polymer different from said first polymer.

In another embodiment, an aqueous dispersion of polymers is provided which comprises: (a) a first cationic water-soluble or water-swellable polymer having at least one recurring unit of the formula (I), wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is an alkyl or substituted alkyl group having from 1 to 10 carbons, or an aryl or substituted aryl group having from 6 to 10 carbons, X is a counterion, and $R_2$, $R_3$, and $R_4$ together contain a total of at least 4 carbon atoms; and (b) at least one second water-soluble polymer different from said first polymer, wherein a homogeneous composition is obtained in the absence of said (b).

In another embodiment, a process for making an aqueous dispersion of polymers is provided which comprises polymerizing vinyl-addition monomers to form an aqueous dispersion comprised of a first cationic water-soluble or water-swellable polymer, wherein said polymerizing is earned out in the presence of an aqueous composition comprised of (a) at least one second water-soluble polymer different from said fast polymer; (b) a kosmotropic salt; and (c) a chaotropic salt, wherein the mounts of said (a), (b) and (c) are such that a homogeneous composition is obtained if said polymerizing is carried out in the absence of said (a).

In another embodiment, a process for making an aqueous dispersion of polymers is provided which comprises polymerizing vinyl-addition monomers to form an aqueous dispersion comprised of a first cationic water-soluble or water-swellable polymer, wherein said polymerizing is carried out in the presence of an aqueous composition comprised of (a) at least one second water-soluble polymer different from said first polymer; (b) a kosmotropic salt; and (c) of an anionic organic salt, wherein the amounts of said (a), (b) and (c) are such that a homogeneous composition is obtained if said polymerizing is carried out in the absence of said (a).

In another embodiment, a process for making an aqueous dispersion of polymers is provided which comprises polymerizing vinyl-addition monomers comprised of at least one monomer of the formula (II) to form an aqueous dispersion comprised of a first cationic water-soluble or water-swellable polymer,

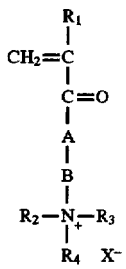

wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is a methyl, ethyl or propyl group, X is a counterion, and $R_2$, $R_3$, and $R_4$ together contain a total of at least 4 carbon atoms; and wherein said polymerizing is carried out in the presence of an aqueous composition comprised of at least one second water-soluble polymer different from said fast polymer.

In another embodiment, a process for making an aqueous dispersion of polymers is provided which comprises polymerizing vinyl-addition monomers comprised of at least one monomer of the formula (II) to form an aqueous dispersion comprised of a first water-soluble or water-swellable cationic polymer, wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is an alkyl or substituted alkyl group having from 1 to 10 carbons, or an aryl or substituted aryl group having from 6 to 10 carbons, X is a counterion, and $R_2$, $R_3$, and $R_4$ together contain a total of at least 4 carbon atoms; and wherein said polymerizing is carried out in the presence of an aqueous composition comprised of an mount of at least one second water-soluble polymer different from said first polymer; and wherein said amount of said second polymer is such that a homogeneous composition is obtained if said polymerizing is carried out in the absence of said second polymer.

In another embodiment, a process for blending two or more aqueous dispersions is provided, comprising intermixing (a) a first aqueous dispersion of a water-soluble or water-swellable polymer with (b) a second aqueous dispersion of a water-soluble or water-swellable polymer, wherein said (a) is different from said (b), to form a third aqueous dispersion.

In another embodiment, a method of dewatering a suspension of dispersed solids is provided which (a) intermixing an aqueous dispersion of polymers, or aqueous admixture thereof, in an amount effective for dewatering, with a suspension of dispersed solids, and (b) dewatering said suspension of dispersed solids, said aqueous dispersion being comprised of (i) a first cationic water-soluble or water-swellable polymer; and (ii) at least one second water-soluble polymer different from said first polymer; and (iii) a kosmotropic salt; and (iv) a chaotropic salt, wherein the amounts of said (ii), (iii) and (iv) are such that a homogeneous composition is obtained in the absence of said (ii).

In another embodiment, a method of dewatering a suspension of dispersed solids is provided which comprises (a) intermixing an aqueous dispersion of polymers, or aqueous admixture thereof, in an amount effective for dewatering, with a suspension of dispersed solids, and (b) dewatering said suspension of dispersed solids, said aqueous dispersion being comprised of (i) a first cationic water-soluble or water-swellable polymer; and (ii) at least one second water-soluble polymer different from said first polymer; and (iii) a kosmotropic salt; and (iv) an anionic organic salt, wherein the amounts of said (ii), (iii) and (iv) are such that a homogeneous composition is obtained in the absence of said (ii).

In another embodiment, a method of dewatering a suspension of dispersed solids is provided which comprises (a) intermixing an aqueous dispersion of polymers, or aqueous admixture thereof, in an amount effective for dewatering, with a suspension of dispersed solids, and (b) dewatering said suspension of dispersed solids, said aqueous dispersion being comprised of (i) a discontinuous phase containing polymer that is comprised predominately of a first cationic water-soluble or water-swellable polymer having at least one recurring unit of the formula (I), wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is a methyl, ethyl or propyl group, X is a counterion, and $R_2$, $R_3$, and $R_4$ together contain a total of at least 4 carbon atoms; and (ii) at least one second water-soluble polymer different from said first polymer.

In another embodiment, a method of dewatering a suspension of dispersed solids is provided which comprises (a) intermixing an aqueous dispersion of polymers, or aqueous admixture thereof, in an amount effective for dewatering, with a suspension of dispersed solids, and (b) dewatering said suspension of dispersed solids, said aqueous dispersion being comprised of (i) a first cationic water-soluble or water-swellable polymer having at least one recurring unit of the formula (I), wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is an alkyl or substituted alkyl group having from 1 to 10 carbons, or an aryl or substituted aryl group having from 6 to 10 carbons, X is a counterion, and $R_2$, $R_3$, and $R_4$ together contain a total of at least 4 carbon atoms; and (ii) at least one second water-soluble polymer different from said first polymer, wherein a homogeneous composition is obtained in the absence of said (ii).

In another embodiment, a process for producing substantially dry water-soluble or water-swellable vinyl-addition polymer particles is provided which comprises (a) spray-drying a vinyl-addition polymer-containing aqueous dispersion into a gas stream with a residence time of about 8 to about 120 seconds and at an outlet temperature of about 70° C. to about 150° C. and (b) collecting resultant polymer particles.

In another embodiment, substantially dry water-soluble or water-swellable polymer particles are provided which are comprised of (a) a first cationic water-soluble or water-swellable polymer; and (b) at least one second water-soluble polymer different from said first polymer; and (c) a kosmotropic salt; and (d) a chaotropic salt, wherein about 90% or more of said polymer particles each individually contains both said (a) and said (b), said particles having a bulk density of about 0.4 grams per cubic centimeter to about 1.0 grams per cubic centimeter.

In another embodiment, there is provided a method comprising (a) intermixing a composition comprising substantially dry water-soluble or water-swellable polymer particles comprised of (i) a first cationic water-soluble or water-swellable polymer; and (ii) at least one second water-soluble polymer different from said first polymer; and (iii) a kosmotropic salt; and (iv) a chaotropic salt, wherein about 90% or more of said polymer particles each individually contains both said (i) and said (ii), said particles having a bulk density of about 0.4 grams per cubic centimeter to about 1.0 grams per cubic centimeter, with water to form an aqueous polymer admixture, (b) intermixing said aqueous polymer admixture, in an amount effective for dewatering, with a suspension of dispersed solids, and (c) dewatering said suspension of dispersed solids.

In another embodiment, there is provided a method comprising (a) intermixing a composition comprising substantially dry water-soluble or water-swellable polymer particles comprised of (i) a first cationic water-soluble or water-swellable polymer; and (ii) at least one second water-soluble polymer different from said first polymer; and (iii) a kosmotropic salt; and (iv) an anionic organic salt, wherein about 90% or more of said polymer particles each individually contains both said (i) and said (ii), said particles having a bulk density of about 0.4 grams per cubic centimeter to about 1.0 grams per cubic centimeter, with water to form an aqueous polymer admixture, (b) intermixing said aqueous polymer admixture, in an amount effective for dewatering, with a suspension of dispersed solids, and (c) dewatering said suspension of dispersed solids.

In another embodiment, there is provided a method comprising (a) intermixing a composition comprising substantially dry water-soluble or water-swellable polymer particles comprised of (i) a first cationic water-soluble or water-swellable polymer having at least one recurring unit of the formula (I), wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is an alkyl or substituted alkyl group having from 1 to 10 carbons, or an aryl or substituted aryl group having from 6 to 10 carbons, X is a counterion, and $R_2$, $R_3$, and $R_4$ together contain a total of at least 4 carbon atoms; and (ii) at least one second water-soluble polymer different from said first polymer, wherein about 90% or more of said polymer particles each individually contains both said (i) and said (ii), said particles having a bulk density of about 0.4 grams per cubic centimeter to about 1.0 grams per cubic centimeter, with water to form an aqueous polymer admixture, (b) intermixing said aqueous polymer admixture, in an amount effective for dewatering, with a suspension of dispersed solids, and (c) dewatering said suspension of dispersed solids.

DETAILED DESCRIPTION OF PREFERRED EMBODIMENTS

The aqueous dispersions of the instant invention contain a first cationic water-soluble or water-swellable polymer, preferably a vinyl-addition polymer. The cationic charge of said first cationic polymer may vary over a broad range by containing from about 1% to about 100% cationic recurring units, preferably about 5% or greater, more preferably about 10% or greater, even more preferably about 20% or greater, most preferably about 30% or greater, preferably about 90% or less, more preferably about 80% or less, most preferably about 70% or less, by mole based on total moles of recurring units in said first cationic polymer. Cationic recurring units may be formed by post-reaction of polymer, but are preferably formed by polymerization of cationic monomers. Cationic monomers may include any cationic monomer, including diallyldialkylammonium halide, cationic (meth)acrylates, and cationic (meth)acrylamides commonly used in preparing water-soluble polymers, preferably diallyldimethylammonium halide, as well as acid and quaternary salts of dialkylaminoalkyl(alk)acrylate and dialkylaminoalkyl (alk)acrylamide. Cationic recurring units may be formed by the polymerization of quaternizable monomers such as dialkylaminoalkyl(alk)acrylate or dialkylaminoalkyl(alk)acrylamide, followed by acidification or quaternization. Most preferably, the first cationic polymer contains cationic recurring units of the formula (I), preferably formed by polymerization of the corresponding monomers of the formula (II):

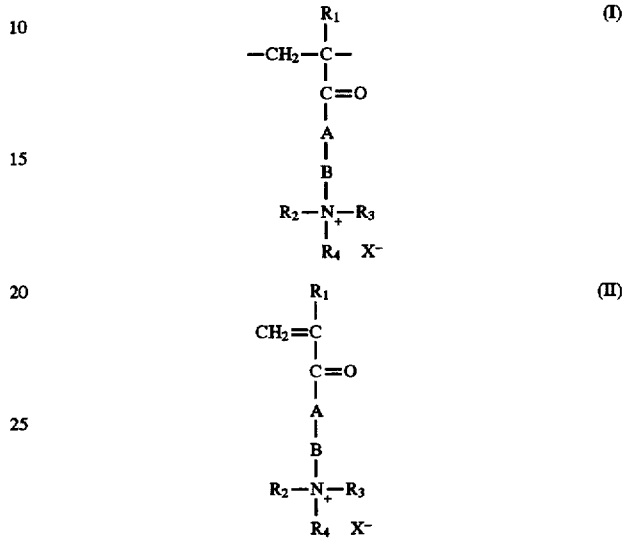

wherein $R_1$ is H or $CH_3$, A is O or NH, B is alkylene or branched alkylene or oxyalkylene having from 1 to 5 carbons, $R_2$ and $R_3$ are each individually methyl, ethyl, or propyl, $R_4$ is an alkyl or substituted alkyl group having from 1 to 10 carbon atoms, or an aryl or substituted aryl group having from 6 to 10 carbon atoms, X is a counterion, and $R_2$, $R_3$ and $R_4$ together contain at least a total of 4 carbon atoms, preferably at least 5 carbon atoms. In certain preferred embodiments, $R_4$ is a methyl, ethyl or propyl group. In other preferred embodiments, $R_4$ is an alkyl or substituted alkyl group having from 4 to 10 carbon atoms. In other preferred embodiments, $R_4$ is benzyl. Preferably, X is chloride, bromide, iodide, methylsulfate, or ethylsulfate.

The first cationic water-soluble or water-swellable polymer may be a copolymer and may contain other cationic recurring units or nonionic recurring units. Nonionic recurring units may be formed from water-soluble monomers such as N-vinylpyridine, N-vinylpyrrolidone, hydroxyalkyl (meth)acrylates, etc., preferably (meth)acrylamide, or may be formed from hydrophobic monomers having low water-solubility, so long as the inclusion of the poorly water-soluble, e.g. hydrophobic, recurring units does not render the resulting polymer water-insoluble or water-nonswellable. The first cationic polymer may contain amounts of recurring units of water-soluble non-ionic monomers ranging from 0% to about 99%, preferably about 10% or greater, more preferably about 20% or greater, most preferably about 30% or greater; preferably about 90% or less, more preferably about 80% or less, most preferably about 70% or less, by mole based on total moles of recurring units in said polymer. The hydrophobic monomers may be hydrocarbon monomers e.g. styrene, butadiene, 1-alkene, vinyl cyclohexane, etc., other vinyl monomers such as vinyl halide, other primarily aliphatic or aromatic compounds with polymerizable double bonds, or monomers with only moderate water-solubility such as acrylonitrile. Preferably, the hydrophobic monomers are alkyl (alk)acrylates or aryl (alk)acrylates in which the alkyl or aryl groups contain about 1–12 carbon atoms, such as methyl (meth)acrylate, ethyl (meth)acrylate, propyl (meth)acrylate, butyl (meth)acrylate, hexyl (meth)acrylate, ethylhexyl (meth)acrylate, isoalkyl (meth)acrylate, cyclohexyl (meth)acrylate, or aromatic (meth)acrylate, or alkyl or aryl (alk)acrylamides in which the alkyl or aryl groups contain about 1–12 carbon atoms, such as methyl (meth) acrylamide, ethyl (meth)acrylamide, t-butyl butyl (meth) acrylamide, dimethyl (meth)acrylamide, hexyl (meth) acrylamide, ethylhexyl (meth)acrylamide, isoalkyl (meth) acrylamide, cyclohexyl (meth)acrylamide, or aromatic (meth)acrylamide. The first cationic water-soluble or water-swellable polymer may contain amounts of hydrophobic non-ionic recurring units ranging from 0% to about 15%, preferably about 2% to about 10%, by mole based on total moles of recurring units in said polymer. Although hydrophobic recurring units may be dilutive of the polymer effect in certain applications, inclusion in controlled amounts may advantageously affect a particular characteristic of the aqueous dispersion, e.g. solubility rate, bulk viscosity, cost, ease of processing, performance, etc. Depending on the specific embodiment, it may be preferable for the polymer to be devoid of hydrophobic recurring units, or to contain chosen amounts of hydrophobic recurring units so as to achieve an advantageous effect without disadvantageously increasing the dilutive effect.

The amount of the first cationic water-soluble or water-swellable polymer in the aqueous dispersion is as high as practicable, taking into account the effect of high solids on bulk viscosity, preferably about 5% or greater, more preferably about 10% or greater, most preferably about 20% or greater, by weight based on the total weight of the aqueous dispersion. Generally, the solids are not increased above an amount which increases the bulk viscosity to an impractical level. Practically, the amount of first cationic polymer in the aqueous dispersion is about 75% or less, preferably about 60% or less, more preferably about 50% or less, by weight based on total weight. The weight average molecular weight of the first cationic polymer in the aqueous dispersion is not critical and depends on the application, but is generally higher than about 1,000,000, preferably greater than about 2,000,000, more preferably greater than about 5,000,000, and most preferably greater than about 10,000,000. Molecular weights of polymers are weight average and may be determined by means known to those skilled in the an, preferably by light scattering.

The aqueous dispersions of the instant invention are generally comprised of a discontinuous phase of small aqueous droplets, containing polymer that is comprised predominately of the first cationic water-soluble or water-swellable polymer, that are dispersed in the aqueous continuous phase, although of course minor amounts of said first polymer may be found in water-swellable polymer hus, the first cationic water-soluble or water-swellable polymer generally constitutes more than 50%, preferably more than 75%, of the polymer in a typical small aqueous droplet. The amount of first cationic polymer in the discontinuous and continuous phases may be determined by known analytical techniques e.g. Raman microscopy. Although large aqueous droplets or gel particles may be formed by adding dry or gel polymer to the other components as in U.S. Pat. No. 4,673, 704 and EP 0 170 394 A2, the aqueous dispersions of the instant invention are preferred because it is generally more desirable for the first cationic polymer to be in the form of small droplets which are generally held suspended in a continuous matrix of the aqueous phase and do not generally rest substantially in contact with one another. Although aqueous dispersions prepared by polymerization of monomers as herein described may sometimes have an average droplet size of about 30 microns or more, the average droplet size is generally less than about 30 microns, preferably less than 20 microns, more preferably about 15 microns or less. Droplet size of a non-spherical droplet is the length along a major axis. Droplet size and shape tend to be a function of reactor conditions such as stirring rate, reactor configuration, type of stirrer, etc. Preferably, the size of the droplets is chosen by carrying out the polymerization in the presence of one or more insoluble polymeric seeds, said polymeric seeds being insoluble in an aqueous solution having the same inorganic salt concentration as said aqueous dispersion.

The aqueous dispersions of the instant invention contain a second water-soluble polymer, preferably a vinyl-addition polymer, that is different from and, preferably, incompatible with, said first water-soluble or water-swellable cationic polymer. The second polymer is different from the first polymer when it can be distinguished from the first polymer on the basis of a particular physical characteristic e.g. chemical composition, charge, molecular weight, molecular weight distribution, distribution of recurring units along the polymer chain, etc., by known characterization methods e.g. spectroscopy, chromatography, etc. The second polymer is incompatible with the first polymer when solutions of the two polymers, at the concentrations present in the aqueous dispersion, do not form a homogenous mixture when blended, or do not form a homogenous mixture when one polymer is formed by polymerization of monomers in the presence of the other polymer.

The second, preferably cationic, water-soluble polymer in the aqueous dispersion of the instant invention is generally dissolved in the aqueous continuous phase, although of course minor amounts may be found in the discontinuous phase. The amount of second polymer in the discontinuous and continuous phases may be determined by known analytical techniques e.g. Raman microscopy. The second polymer may be any nonionic water-soluble polymer, preferably a polyalkyleneoxide, a polyvinylalcohol, polyvinylpyridine, polyvinylpyrollidone, polyhydroxylalkyl(alk)acrylate, etc., most preferably poly(meth)acrylamide. Even more preferably, the second water-soluble polymer is cationic. The second polymer may be any cationic polymer, and the charge may vary over a broad range by containing about 1% to about 100% cationic recurring units, preferably about 10% or greater, more preferably about 20% or greater, even more preferably about 30% or greater, by mole based on total moles of recurring units in the polymer. Although in some cases the second cationic polymer may contain about 70% or less, or even about 50% or less, of cationic recurring units, preferably the second polymer is predominately cationic i.e. contains more than 50% cationic recurring units, by mole based on total moles of recurring units in the polymer; most preferably about 80% or greater of recurring cationic units, same basis. Cationic recurring units may be formed by polymerization of cationic monomers or by post-reaction of polymer as above, and may be a copolymer and may contain other cationic recurring units or nonionic recurring units as above. Preferred second cationic water-soluble polymers contain recurring units of diallyldialkylammonium halide, methyl chloride quaternary salt of dialkylaminoalkyl(alk) acrylate, dimethyl sulfate quaternary salt of dialkylaminoalkyl(alk)acrylate, methyl chloride quaternary salt of dialkylaminoalkyl(alk)acrylamide, or dimethyl sulfate quaternary salt of dialkylaminoalkyl(alk)acrylamide. Especially preferred second cationic water-soluble polymers contain recurring units of diallyldimethylammonium chloride, methyl chloride quaternary salt of dimethylaminoethyl(meth)acrylate, or dimethyl sulfate quaternary salt of dimethylaminoethyl(meth)acrylate. One or more second cationic polymers may be used.

Depending on the application, it may be preferable for the second polymer to be cationic in order to maximize the cationic charge density of the aqueous dispersion. Also, for embodiments which contain salt, it may be preferable for the second polymer to be cationic because cationic polymers are often more soluble in salt solution than nonionic polymers.

The amount of the second, preferably cationic, water-soluble polymer in the aqueous dispersion is generally chosen to control aqueous dispersion properties e.g. performance, bulk viscosity, charge, molecular weight, solubility rate, physical stability, e.g. settling, etc. Generally, the amount of said second polymer is about 5% or greater, preferably about 10% or greater, more preferably about 20% or greater, most preferably about 30% or greater, by weight based on the amount of first cationic water-soluble polymer. Practically, the amount of second water-soluble polymer in the aqueous dispersion is 100% or less, preferably about 80% or less, more preferably about 50% or less, by weight based on the amount of first cationic water-soluble polymer. In certain preferred embodiments, the amounts of the first and second polymers are effective to form an aqueous dispersion. In some embodiments, an aqueous dispersion is not formed in the absence of the second polymer, and a homogeneous composition is obtained instead. Practically, the amount of first and second polymer may be found by routine experimentation, and different amounts will ordinarily be used depending on the identity of the first and second polymers, the total polymer solids level, the bulk viscosity, cost, ease of production, product performance, etc.

The weight average molecular weight of the second water-soluble polymer in the aqueous dispersion is also generally chosen to provide the most advantageous effect, e.g. bulk viscosity, performance, cost, etc., but is generally higher than about 10,000, preferably greater than about 50,000, more preferably greater than about 500,000, and most preferably greater than about 1,000,000. Molecular weights of polymers are weight average and may be determined by means known to those skilled in the art, preferably by light scattering. The second water-soluble polymer is primarily in the continuous phase of the aqueous dispersion, although of course minor mounts may be contained in the dispersed droplets. Preferably, the aqueous dispersions of the instant invention are heterogeneous compositions in which more than 50%, preferably about 75% or more, of the first cationic water-soluble or water-swellable polymer is in the form of a discontinuous phase of aqueous droplets that are dispersed in an aqueous solution that is comprised of more than 50%, preferably about 75% or more, of the second, preferably cationic, water-soluble polymer.

The aqueous dispersions of the instant invention may contain a third water-soluble or water-swellable polymer that is different from the first or second polymers. For instance, the third polymer may also be contained in droplets dispersed in the aqueous solution, in which case it may be described as discussed above for the first cationic polymer. The third polymer may also be dissolved in the aqueous solution along with the second polymer, in which case it may be described as discussed above for the second polymer. Preferably, the third polymer is cationic.

A third aqueous dispersion, containing three or more polymers, may be formed by blending first and second aqueous dispersions of the instant invention, wherein the first and second aqueous dispersions are different from each other. Blending is generally carried out by intermixing the aqueous dispersions, typically with stirring. Blending may be advantageous to achieve a balance of properties exhibited by the individual aqueous dispersions, e.g. performance, charge, total polymer solids, cost, molecular weight, etc. Surprisingly, in many cases the blends are stable, e.g. remain in the form of aqueous dispersions having low bulk viscosity e.g. less than 10,000 centipoise for periods of one week or more, even when the salt or second polymer level in the blend is greatly different from the level needed to obtain a stable product for one or both of the dispersed polymers, if formulated alone. Also surprisingly, the bulk viscosity of the blend is often lower than the bulk viscosity of any of the individual aqueous dispersions.

The molecular weight of the aqueous dispersion, as that term is used herein, is simply the weight average molecular weight of the polymers contained therein, obtained by subjecting the entire dispersion to a suitable molecular weight characterization technique e.g. light scattering. Since the aqueous dispersion contains two or more different polymers, each of which may have a molecular weight and molecular weight distribution different from the other(s), the molecular weight distribution of the aqueous dispersion may be multimodal. The molecular weight of the aqueous dispersion is generally about 1,000,000 or greater, preferably greater than 2,000,000, more preferably about 3,000,000 or greater, most preferably about 5,000,000 or greater.

In some cases it may be more convenient to characterize the aqueous dispersion in terms of standard viscosity instead of by molecular weight. As used herein, "standard viscosity" is determined by: diluting an aqueous dispersion with water to form an aqueous admixture (in the case of water-swellable polymers) or solution (in the case of water-soluble polymers) having a polymer concentration of about 0.2%; mixing together 8.0 g of this aqueous admixture or solution with 8.6 g of 2M NaCl; and then measuring the viscosity of the resultant mixture at 25° C. on a rotating cylinder viscometer e.g. Brookfield Viscometer equipped with a UL adapter at 60 rpm. The standard viscosities of the aqueous dispersions of the instant invention are generally about 1.5 centipoise or greater, preferably about 1.8 centipoise or greater, more preferably about 2.0 centipoise or greater, most preferably about 2.5 centipoise or greater, depending on the application.

The aqueous dispersions of the instant invention may also be intermixed with water-in-oil emulsions or microemulsions of water-soluble polymers to form compositions which, though they contain oil, contain proportionately less oil than the water-in-oil emulsions or microemulsions from which they are derived. Consequently, these compositions may advantageously produce less secondary pollution, have lower flammability, etc.

Certain embodiments of the instant invention require salt. Effective amounts of salt tend to reduce the bulk viscosity of the aqueous dispersion. The salt may be any inorganic salt, preferably a kosmotropic salt e.g. a chloride, sulfate, phosphate, or hydrogenphosphate salt, more preferably ammonium sulfate, sodium chloride, and sodium sulfate, most preferably sodium sulfate and ammonium sulfate. The counterion may be any counterion, e.g. Group IA and Group IIA metal ions, ammonium, etc., preferably ammonium, sodium, potassium and magnesium. Mixtures of salts may be used, and the amount of salt may be chosen to achieve a desirable bulk viscosity or any other desirable effect. Since the salt may have a dilutive effect, in certain preferred embodiments the salt is only added in mounts so as to achieve a homogeneous composition in the absence of the second water-soluble polymer. In these embodiments, the aqueous dispersion is not formed by the action of the salt, but by the interaction of the first and second polymers. Effective or viscosity-reducing mounts of salt may be found through routine experimentation and are generally chosen to reduce the bulk viscosity without causing precipitation of the polymer. In other preferred embodiments, the salt is only added in amounts so as to achieve a homogeneous composition in the absence of the fast cationic polymer. In embodiments where salt is helpful but not necessary, salt levels may range upwards from 0%, preferably about 3% or greater, most preferably about 5% or greater, by weight based on total weight, depending on the upper limit to solubility, because solubility of the salt in the aqueous dispersion is preferred. In embodiments where salt is necessary, salt levels are chosen to favorably influence product attributes such as cost, bulk viscosity, etc. and may range upwards from about 1%, preferably about 3% or greater, most preferably about 5% or greater, by weight based on total weight, depending on the upper limit to solubility, because solubility of the salt in the aqueous dispersion is preferred. Frequently, no practical effect of the salt is observed above about 30%, so salt levels are generally about 30% or less, preferably about 25% or less, by weight based on total weight. Practically, the salt level may be determined by routine experimentation, e.g. balancing the tendency for positive product attributes e.g. lower bulk viscosities resulting from higher salt levels, against the negative aspects of salt use e.g. cost and dilutive effect.

Surprisingly, it has been discovered that mixtures of chaotropic salts with kosmotropic salts, or anionic organic salts with kosmotropic salts, have a tendency to reduce the bulk viscosity of the aqueous dispersion. In many cases, the salt mixture is more effective than either salt alone, on a weight basis. Useful chaotropic salts include thiocyanates, perchlorates, chlorates, nitrates, bromides, iodides, and mixtures thereof, preferably sodium thiocyanate and sodium iodide. Useful anionic organic salts include anionic surfactants and anionic hydrotropic salts, preferably aryl and substituted aryl sulfonates having from 6 to 22 carbons, preferably 6 to 18 carbons, and alkyl and substituted alkyl sulfonates having from 2 to 22 carbons, preferably 4 to 18 carbons, and mixtures thereof. Especially preferred anionic organic salts are dialkylsulfosuccinates, diarylsulfosuccinates, benzenesulfonates, benzenedisulfonates, naphthalensulfonates, naphthalenedisulfonates, and mixtures thereof; 1,3-benzendisulfonates are most preferred. Counterions to the chaotropic and anionic organic salts may be any typical counterion, e.g. Group IA metal ions, ammonium, etc., preferably ammonium, sodium, and potassium. Effective or viscosity-reducing amounts of chaotropic and anionic organic salts may be found through routine experimentation and are generally chosen to reduce the bulk viscosity without causing precipitation of the polymer. In certain preferred embodiments, the amounts of chaotropic salt, or anionic organic salt and kosmotropic salt are chosen such that a homogeneous composition is obtained in the absence of the second cationic polymer; i.e. the concentration of the salts is such that the first cationic polymer is not precipitated in the absence of the second cationic polymer. Generally, amounts of chaotropic, or anionic organic, salts are about 10% or less, preferably about 5% or less, and generally 0.5% or more, preferably 1% or more, by weight based on total weight. At very low chaotropic or anionic organic salt levels, the viscosity-reducing effect of the salt is negligible, whereas the salt may cause undesirable precipitation or layering at high levels of incorporation. To achieve a certain bulk viscosity, amounts of kosmotropic salts used with the chaotropic, or anionic organic salt, are generally less than when the kosmotropic salt is used alone, but still within the ranges given above for the use of inorganic or kosmotropic salts alone.

The aqueous dispersions of the instant invention generally have lower bulk viscosities than comparable aqueous dispersions. A comparable aqueous dispersion is generally one which is substantially identical in many functional aspects, but lacks a particular element of the instant invention. In general, the aqueous dispersions of the instant invention have lower bulk viscosities than comparable aqueous dispersions which have substantially the same polymer solids, cationic charge level and weight average molecular weight, but which lack an important feature of the instant invention e.g. lack a recurring unit of formula (I); lack the amount of recurring units of formula I found in the aqueous dispersions of the instant invention; not made by a process which comprises polymerizing vinyl-addition monomers comprised of at least one monomer of the formula (II); not made by a process which comprises polymerizing vinyl-addition monomers comprised of the amount of monomers of the formula (II) used in the processes of the instant invention, etc. For instance, in a composition comprising an aqueous dispersion comprised of: (a) a discontinuous phase containing polymer that is comprised predominately of a first cationic water-soluble or water-swellable polymer having at least one recurring unit of the formula (I), and (b) at least one second water-soluble polymer different from said first polymer, a comparable aqueous dispersion may be one which contains the same amount of each component, except the $R_2$, $R_3$ and $R_4$, in the corresponding recurring formula (I) unit of the comparable aqueous dispersion together contain a total of 3 carbon atoms, instead of the 4 or more carbons in the corresponding recurring unit of formula (I) in the claimed aqueous dispersion.

Surprisingly, aqueous dispersions having formula (I) recurring units in which $R_2$, $R_3$ and $R_4$ contain four or, preferably, five carbons generally have bulk viscosities which are dramatically lower than the bulk viscosities of aqueous dispersions that are substantially identical except that $R_2$, $R_3$ and $R_4$ contain only three carbons. The bulk viscosity of aqueous dispersions is typically influenced by e.g. total polymer solids, salt level, polymer type, ratio of first cationic polymer to second cationic polymer, etc. as disclosed herein. Although aqueous dispersions having bulk viscosities of about 20,000 centipoise (cps) or more, or even about 200,000 cps or more may be suitable in certain circumstances, much lower bulk viscosities are generally preferred for ease of handling. Aqueous dispersions having bulk viscosities of about 20,000 centipoise (cps) or less, preferably about 10,000 cps or less, more preferably about 8,000 cps or less, even more preferably about 5,000 cps or less, most preferably about 2,500 cps or less, may be obtained by the practice of the instant invention. Bulk viscosity may be measured by any convenient method known to those skilled in the art, preferably a rotating cylinder viscometer as described in the Examples below.

Aqueous dispersions are preferred which have as many of the following advantageous attributes as possible: relatively high cationic polymer solids, preferably 20% or greater, more preferably 25% or greater, by weight based on total; high molecular weight, preferably 2,000,000 or greater, more preferably 5,000,000 or greater; reduced environmental impact (low VOC, substantially free of organic solvents and aromatic groups, e.g. aromatic- or benzyl-containing oils or recurring units); minimal levels of diluents (preferably, 20% or less of salt, by weight based on total, and polymer devoid or substantially free of hydrophobic recurring units); bulk viscosity about 2,000 cps or less; for recurring units based on formula (I), $R_2$, $R_3$ and $R_4$ together containing a total of 5 carbons; and superior or equivalent performance. Products having all of these attributes may be obtained by the practice of the present invention.

Aqueous dispersions of water-soluble polymers are preferably formed by polymerization of the corresponding monomers to form the first cationic water-soluble polymer, in the presence of at least one second cationic water-soluble polymer and, in certain embodiments, an inorganic salt. Polymerization may be effected by any initiating means, including redox, thermal or irradiating types. Examples of preferred initiators are 2,2'-azobis(2-amidino-propane) dihydrochloride (V-50), 2,2'-azobis(isobutyronitrile), sodium bromate/sulfur dioxide, potassium persulfate/sodium sulfite, and ammonium persulfate/sodium sulfite, as well as peroxy redox initiators e.g. those disclosed in U.S. Pat. No. 4,473,689. Initiator levels are chosen in a known manner so as to create polymers of the desired molecular weight. Amounts of chain transfer agents, e.g. isopropanol, lactic acid, mercaptoethanol, etc. and branching or crosslinking agents, e.g. methylenebisacrylamide may be added in a known manner to further adjust the properties of the first cationic water-soluble polymer. Depending on the production conditions, e.g. types and relative amounts of chain transfer agent and branching agent, water-swellable or branched, water-soluble polymers may be formed. In general, the use of greater amounts of branching or crosslinking agent increases the tendency for the product to be water-swellable instead of water-soluble, and increased amounts of chain transfer agent tend to reduce molecular weight. When chain transfer agent and branching agent are used together, water-swellable products are more likely to be obtained at high branching agent and low chain transfer agent levels, whereas branched, water-soluble polymers may be obtained at high chain transfer and low branching agent levels. Components may be added at any time; e.g. all of the monomers may be present from the onset of the polymerization, or monomers may be added during the course of the polymerization. If salt is used, all of the salt may be present from the onset of the polymerization, or salt may be added during the course of the polymerization or after polymerization is complete. Likewise, polymerization parameters e.g. temperature and time may be chosen in a known manner, and may be varied during the course of the polymerization. Polymerization is generally effected in the presence of an inert gas, e.g. nitrogen. Conventional processing aids e.g. chelating agents, sequestrants, pH adjusters, etc. may be added as required.

The aqueous dispersions of the present invention have advantageous aspects in that they are preferably substantially free of dilutive substances such as surfactant, oil, hydrocarbon liquids, organic solvents, etc. Although viscosity-reducing additives e.g. glycerin, glycerol, alcohol, glycol, etc. may be present in the aqueous dispersions, amounts should be 2% or less, more preferably 0.1% or less, most preferably 0.1% or less, in order to maintain the advantageous properties of the invention.

The aqueous dispersions of the instant invention may be homogenous in the absence of a particular component e.g., said second water-soluble polymer. Homogenous compositions are generally characterized as being clear or translucent, and are not aqueous dispersions because they do not contain dispersed droplets as described above. Depending on the embodiment, said first cationic water-soluble polymer or said second cationic water-soluble polymer is dispersion-creating in that aqueous dispersions are not obtained in the absence of an effective or dispersion-creating amount of the particular component.

Waters used in the present invention may be from any source, e.g. process water, river water, distilled water, tap water, etc. Preferably, polymerizations are conducted in aqueous solutions that do not contain substantial amounts of materials which detrimentally affect the polymerization. Advantageously, the aqueous dispersions of the present invention tend to dissolve quickly when diluted with water.

The aqueous dispersion of the instant invention may be dehydrated to increase the total polymer solids content, or to cream substantially dry products. Any means known in the art e.g. stripping, spray drying, solvent precipitation, etc. may be used to reduce the water content. Surprisingly, partial dehydration may reduce the bulk viscosity of an aqueous dispersion, in spite of the tendency for dehydration to increase polymer solids. Dehydration may be performed by heating, preferably under reduced pressure, although of course excessive heating may be detrimental to polymer properties. A substantially dry mass of polymer may be obtained by removal of water, and the mass may be comminuted to create a powdery, particulate, or granular product.

Surprisingly, substantially dry polymer products may be obtained by spray-drying the aqueous dispersions of the instant invention. Although oil-containing polymer emulsions and dispersions have been spray-dried, see e.g. U.S. patent application Ser. No. 08/668,288 and references therein, spray-drying of aqueous dispersions, which are generally free of oil and surfactants, has not previously been reported. In accordance with the instant invention, vinyl-addition polymer-containing aqueous dispersions may be sprayed-dried by a suitable means into a large chamber through which a hot gas is blown, thereby removing most or all of the volatiles and enabling the recovery of the dried polymer. Surprisingly, the means for spraying the aqueous dispersion into the gas stream are not particularly critical and are not limited to pressure nozzles having specified orifice sizes; in fact, any known spray-drying apparatus may be used. For instance, means that are well known in the art such rotary atomizers, pressure nozzles, pneumatic nozzles, sonic nozzles, etc. can all be used to spray-dry the aqueous dispersion into the gas stream. The feed rate, feed viscosity, desired particle size of the spray-dried product, droplet size of the aqueous dispersion, etc. are factors which are typically considered when selecting the spraying means. The size and shape of the chamber, the number and type of spraying means, and other typical operational parameters may be selected to accommodate dryer conditions using common knowledge of those skilled in the art.

Although closed cycle spray-dryers may be used, open cycle spray-drying systems are preferred. Gas flow may be cocurrent, countercurrent or mixed flow, cocurrent flow being preferred. The hot gas, or inlet gas, may be any gas that does not react or form explosive mixtures with the feed and/or spray-dried polymer. Suitable gases used as the inlet gas are gases known to those skilled in the art, including air, nitrogen, and other gases which will not cause undesirable polymer degradation or contamination, preferably gases containing about 20% or less oxygen, more preferably about 15% or less oxygen. Most preferably, inert gases such as nitrogen, helium, etc. that contain about 5% or less of oxygen should be used.

The dried polymer may be collected by various means such as a simple outlet, classifying cone, bag filter, etc., or the polymer may be subjected-to further stages of drying, such as by fluid beds, or agglomeration. The means for collecting the dry polymer product is not critical.

There are four interrelated operating parameters in the instant spray-drying process: gas inlet temperature, gas outlet temperature, product volatiles and residence time in the dryer. The outlet temperature generally should be about 150° C. or below, preferably about 120° C. or below, more preferably less than 100° C., even more preferably about 95° C. or below, most preferably about 90° C. or below. The outlet temperature is generally about 70° C. or higher, preferably about 75° C. or higher. Therefore, outlet temperatures are generally about 70° C. to about 150° C., preferably about 70° C. to about 120° C., more preferably about 70° C. to less than 100°, even more preferably about 70° C. to about 95° C., most preferably about 75° C. to about 90° C. Outlet temperatures below about 70° C. may be suitable in certain instances, though generally this is less preferred. For instance, at the cost of efficiency, spray drying could be carried out at long residence times, high gas flow rates and low outlet temperatures. Generally, the dryer should be operated at the lowest possible outlet temperature consistent with obtaining a satisfactory product.

The inlet temperature, the feed rate, and the composition of the aqueous dispersions may all affect outlet temperatures. These parameters may be varied to provide a desired outlet temperature. Feed rates are not critical, and generally will vary depending on the size of the dryer and the gas flow rate. Inlet gas temperature is less critical than outlet gas temperature, and is generally about 140° C. or above, preferably about 160° C. or above. The inlet gas temperature is preferably about 200° C. or below and more preferably about 180° C. or below. Thus, preferred inlet gas temperature ranges from about 140° C. to about 200° C., more preferably from about 160° C. to about 180° C. Proper inlet gas temperatures tend to avoid product degradation on the high side and to avoid inadequate drying on the low side.

Residence time is a nominal value obtained by dividing the volume of the dryer by the volumetric gas flow. Residence time is generally at least about 8 seconds, preferably at least about 10 seconds. Residence time is generally no more than about 120 seconds, preferably no more than about 90 seconds, more preferably no more than about 60 seconds, and most preferably no more than about 30 seconds. Therefore, the general range of residence time is about 8 to about 120 seconds, preferably about 10 to about 90 seconds, more preferably about 10 to about 60 seconds, and most preferably about 10 to about 30 seconds. It is known to those skilled in the art that longer residence times are to be expected when larger dryers are used or when the dryer is run in a less efficient manner. For instance, at the cost of efficiency, longer residence times would be expected at very low inlet temperatures and slow gas flow rates. As a practical matter, the residence times useful in the present invention may vary from the values described above, depending on the size and type of spray dryer used, the efficiency at which it is operated, and other operational parameters. Thus, residence times specified herein may be modified to accommodate dryer conditions using common knowledge of those skilled in the art.

When produced according to the spray drying processes disclosed herein, polymer particles of the instant invention are generally about 10 microns or greater in diameter, preferably about 40 microns or greater, more preferably about 100 microns or greater, most preferably about 200 microns or greater. It is preferred that the polymer particles be non-dusting. Dusting and flow problems are typically exacerbated when the polymer particles are small, so larger polymer particles are generally desirable. However, very large particles may dissolve more slowly. Therefore, it is generally desirable for the polymer particles to be about 1200 microns or less in diameter, preferably about 800 microns or less in diameter, more preferably about 600 microns or less, most preferably about 400 microns or less. Generally, at least about 90% of the polymer particles range in size from about 10 microns to about 1200 microns, preferably at least about 95%, more preferably at least about 98%. The size of the polymer particles can be varied somewhat by altering the operational parameters e.g. spray configuration, aqueous dispersion viscosity, feed rate, etc. Particles may be substantially spherical or non-spherical; "diameter" of a non-spherical particle is the dimension along a major axis.

Although in some cases the polymer particles are hollow, porous structures having at least one opening in their walls, it has been discovered that these features are not always necessary in order to obtain particles having desirable properties e.g. fast dissolution times. In many cases, the spray-drying parameters e.g. nozzle type, nozzle size, outlet temperature, etc. needed to produce particles that are hollow, porous structures having at least one opening in their walls are inconvenient or uneconomical, and it is advantageous to produce particles that lack some or all of these features.

The particles formed by the spray-drying processes of the instant invention may be screened to remove an oversize or undersize fraction. Oversize particles may be fragmented by e.g. grinding, whereas undersized particles are generally agglomerated. Sizes may be determined by methods known to those skilled in the art e.g. sieving, screening, light scattering, microscopy, microscopic automated image analysis, etc.

Surprisingly, the bulk densities of the spray-dried polymer particles of the instant invention are generally greater than the bulk densities of dry polymers prepared by precipitation of e.g. water-in-oil emulsions of the same polymer. Polymer particles having greater density may be advantageous because they occupy a smaller volume, resulting in e.g. lower shipping and storage costs. Whereas the densities of precipitated polymers are usually less than about 0.35 grams per cubic centimeter (g/cc), the bulk densities of the spray-dried polymer particles of the instant invention are generally about 0.35 g/cc or greater, preferably about 0.4 g/cc or greater, more preferably about 0.45 g/cc or greater, most preferably about 0.50 g/cc or greater. The bulk densities of the spray-dried polymer particles of the instant invention are generally about 1.1 g/cc or less, preferably about 1.0 g/cc or less, more preferably about 0.95 g/cc or less, most preferably about 0.90 g/cc or less. Therefore, the bulk densities of the spray-dried polymer particles of the instant invention generally range from about 0.35 to about 1.1 g/cc, preferably about 0.4 to about 1.0 g/cc, more preferably about 0.45 to about 0.95 g/cc, most preferably about 0.50 to about 0.90 g/cc.

Under the conditions of drying set forth herein, the polymer particles produced by the processes described herein are substantially dry. As used to describe the polymer produced herein, "substantially dry" generally means that the polymer contains about 12% or less volatiles, preferably about 10% or less by weight, based on the weight of the spray dried polymer. The polymer generally contains about 2% or more volatiles, preferably about 5% or more, by weight based on total weight, and most preferably contains from about 8% to about 10% volatiles by weight, same basis. The volatiles are measured by determining the weight loss on drying the polymer product at about 105° C. for about 30 minutes.

It has also been discovered that agglomeration of the polymer particles of the instant invention may improve the flow properties and dissolution times of the polymers. Agglomeration is a known process for increasing particle size and various methods for agglomerating particles are known to those skilled in the art, e.g. "Successfully Use Agglomeration for Size Enlargement," by Wolfgang Pietsch, *Chemical Engineering Progress*, April 1996, pp. 29–45; "Speeding up Continuous Mixing Agglomeration with Fast Agitation and Short Residence Times," by Peter Koenig, *Powder and Bulk Engineering*, February 1996, pp. 67–84. Known agglomeration methods such as natural agglomeration, mechanical agglomeration, tumble or growth agglomeration, pressure agglomeration, binderless agglomeration, agglomeration with binders, etc. may be used to agglomerate the polymer particles of the instant invention. Agglomeration may optionally be followed by drying e.g. fluid bed drying, to remove binder e.g. water. Pressure agglomeration is preferred, and mechanical agglomeration using a water binder, followed by fluid bed drying is most preferred.

The agglomerates formed by agglomerating the polymer particles of the instant invention tend to have improved flow properties and faster dissolution times when compared to the unagglomerated polymer particles. Preferably, the agglomerates are non-dusting. Typically, about 90% of the agglomerates of the instant invention have an agglomerate size of about 120 microns or greater, preferably about 160 microns or greater, more preferably about 200 microns or greater, most preferably about 300 microns or greater. Generally, about 90% of the agglomerates have an agglomerate size of about 1500 microns or less, preferably about 1200 microns or less, more preferably about 1100 microns or less, most preferably about 1000 microns or less. Thus, about 90%, preferably 95%, of the agglomerates have a size in the range of about 120 to about 1500 microns, preferably about 160 microns to about 1200 microns, more preferably about 200 microns to about 1100 microns, most preferably about 300 microns to about 1000 microns Usually, at least about 5% of the agglomerates, preferably at least about 10%, most preferably at least about 15%, are larger than about 900 microns. The agglomerates formed by agglomerating the spray-dried particles of the instant invention may be screened to remove an oversize or undersize fraction. Preferably, agglomerates larger than about 1200 microns and smaller than about 175 microns are removed by e.g. screening. Oversize agglomerates are generally fragmented by e.g. grinding, whereas undersized agglomerates are generally recycled into the agglomerator.

The bulk density values of the agglomerates of the instant invention tend to be lower than the bulk density values of the spray-dried particles from which they are formed. The bulk densities of the agglomerates of the instant invention are generally about 0.35 g/cc or greater, preferably about 0.4 g/cc or greater, more preferably about 0.45 g/cc or greater, most preferably about 0.50 g/cc or greater. The bulk densities of the agglomerates of the instant invention are generally about 1.0 g/cc or less, preferably about 0.95 g/cc or less, more preferably about 0.90 g/cc or less, most preferably about 0.85 g/cc or less. Therefore, the bulk densities of the agglomerates of the instant invention generally range from about 0.35 to about 1.0 g/cc, preferably about 0.4 to about 0.95 g/cc, more preferably about 0.45 to about 0.90 g/cc, most preferably about 0.50 to about 0.85 g/cc.

In order to obtain agglomerates of a preferred size, it is preferred that the polymer particles themselves be of such a size that they are agglomerable. Agglomeration obviously tends to multiply the average particle size, so that it is frequently easier to cause large increases in particle size than it is to cause small increases in particle size. Therefore, to produce agglomerates of a preferred size or size range, it is generally preferred to agglomerate particles that are much smaller than the desired agglomerate size, rather than particles that are only slightly smaller. Agglomerable particles are generally those that may be conveniently agglomerated to produce agglomerates having a preferred size. It is possible, but less preferred, m agglomerate larger particles to produce agglomerates that are larger than desired, then remove the oversize agglomerates as described above.

The substantially dry polymer particles and agglomerates of the present invention are generally comprised of the polymer that was contained in the aqueous dispersion that was spray-dried, as discussed hereinabove.

Spray-drying of the aqueous dispersions of the instant invention is advantageous because typically 90% or greater, preferably 95% or greater, most preferably substantially all, of the resultant spray-dried polymer particles each individually contains two or more water-soluble or water-swellable vinyl-addition polymers, so that stratification effects may be minimized. Stratification may occur when two different dry polymers having differing particle sizes or particle size distributions are blended together because of the tendency for the larger particles to settle towards the bottom of the container. Stratification on storage may affect blend product performance as the top of the container tends to become enriched in the polymer having the smaller particle size. For obvious reasons, changes in product performance as a function of storage depth are to be avoided, and it is generally preferred that each polymer in a blend be of similar particle size, see e.g. EP 479 616 A1 and U.S. Pat. No. 5,213,693. A dry blend of the two different polymers is likely to exhibit greater stratification than a dry blend obtained by spray-drying the instant aqueous dispersions because the majority of the spray-dried polymer particles of the instant invention each individually contains two or more water-soluble or water-swellable vinyl-addition polymers. Surprisingly, the spray-dried aqueous dispersions of the instant invention tend to dissolve faster than polymers obtained by spray-drying conventional water-in-oil emulsions of similar polymers.

A suspension of dispersed solids may be dewatered by a method which comprises (a) intermixing an effective amount of an aqueous dispersion of polymers, or aqueous admixture thereof, with a suspension of dispersed solids, and (b) dewatering said suspension of dispersed solids. Substantially dry polymers derived from the aqueous dispersions of the instant invention as described above may also be used to dewater suspended solids. For instance, a suspension of dispersed solids may be dewatered by a method which comprises (a) intermixing an effective amount of a substantially dry water-soluble or water-swellable polymer, or aqueous admixture thereof, with a suspension of dispersed solids, and (b) dewatering said suspension of dispersed solids. Preferably, an aqueous admixture of the dry polymer or aqueous dispersion is prepared by intermixing the dry polymer or aqueous dispersion with water, more preferably by dissolving the dry polymer or aqueous dispersion in water to form a dilute polymer solution. Effective amounts of dry polymer or aqueous dispersion are determined by methods known in the art, preferably by routine laboratory or process experimentation.

Examples of suspensions of dispersed solids which may be dewatered by means of the instant invention are municipal and industrial waste dewatering, clarification and settling of primary and secondary industrial and municipal waste, potable water clarification, etc. Because of the advantageous aspects of the invention e.g. substantially oil-free, minimum amounts of inactive diluents, little or no surfactant, etc., the polymers may be especially well-suited to situations where pan or all of the dewatered solids or clarified water is returned to the environment, such as sludge composting, land application of sludge, pelletization for fertilizer application, release or recycling of clarified water, papermaking, etc. Other applications which may benefit from the advantageous aspects of the instant inventions include soil amendment, reforestation, erosion control, seed protection/growth, etc., where the aqueous dispersion or dry polymer, preferably an aqueous admixture thereof, is advantageously applied to soil.

Other examples of suspensions of dispersed solids which may be dewatered by means of the instant invention are found in the papermaking area, e.g. the aqueous dispersions or dry polymer may be used as retention aids, drainage aids, formation aids, washer/thickener/drainage production aid (DNT deink application), charge control agents, thickeners, or for clarification, deinking, deinking process water clarification, settling, color removal, or sludge dewatering. The polymers of the instant invention may also be used in oil field applications such as petroleum refining, waster clarification, waste dewatering and oil removal.

Dewatering and clarification applications for the aqueous dispersions and dry polymers of the instant invention may also be found in the food processing area, including waste dewatering, preferably waste dewatering of poultry beef, pork and potato, as well as sugar decoloring, sugar processing clarification, and sugar beet clarification.

Mining and mineral applications for the aqueous dispersions and dry polymers of the instant invention include coal refuse dewatering and thickening, tailings thickening, and Bayer process applications such as red mud settling, red mud washing, Bayer process filtration, hydrate flocculation, and precipitation.

Biotechnological applications for the aqueous dispersions and dry polymers of the instant invention include dewatering and clarification of wastes and preferably, dewatering and clarification of fermentation broths.

The aqueous dispersions of the instant invention may be employed in the above applications alone, in conjunction with, or serially with, other known treatments.

All patents, patent applications, and publications mentioned above are hereby incorporated herein by reference. Unless otherwise specified, all percentages mentioned herein are understood to be on a weight basis.

The Standard Viscosity (SV) values in the following Examples were determined by mixing together 8.0 g of a 0.2 wt. % polymer solution in water and 8.6 g of 2M NaCl, then measuring the viscosity of the resultant solution at 25° C. on a Brookfield Viscometer equipped with a UL adapter at 60 rpm. Molecular weights were determined by high performance size exclusion chromatography using a light scattering detector.

The bulk density of polymer particles and agglomerates was determined by adding the particles or agglomerates to a suitable preweighed measuring container and "tapping" or slightly agitating the container to cause the particles or agglomerates to settle. The volume of the polymer was then read from the measuring container, the measuring container weighed, and the bulk density calculated in units of grams per cubic centimeter (g/cc).

EXAMPLE 1

A suitable vessel equipped with a mechanical stiffer, reflux condenser, and a nitrogen inlet tube was charged with 17.10 parts deionized water and 9 parts of a 40% aqueous solution of the polymer obtained by polymerizing the methyl chloride quaternary salt of dimethylaminoethylmethacrylate (poly(DMAEM.MeCl)), weight average molecular weight about 200,000. After completion of dissolution, 7.08 parts of a 53.64% aqueous solution of acrylamide (AMD), and 14.56 parts of a 72.80% solution of the dimethyl sulfate salt of diethylaminoethylacrylate (DEAEA.DMS) were added and mixed. To this mixture, 8.1 parts ammonium sulfate, 0.7 parts citric acid, and 2.02 parts of a 1% solution of chelant ethylenediaminetetraacetic acid tetrasodium salt (EDTA) were added and mixed. The pH of the mixture was about 3.3. The vessel was sealed and sparged with nitrogen for 30 minutes, and then polymerization was started by adding 1.44 parts of 1% aqueous solution of 2,2'-azobis(2-amidinopropane)dihydrochloride (V-50). The reaction mixture was heated to 40° C. for 2 hours and then raised to 50° C. and held for an additional 8 hours. The conversion was greater than 99%. A stable fluid aqueous dispersion was obtained. The bulk viscosity (BV) of the dispersion was 2250 centipoise (cps) showing preferable fluidity as measured with a Brookfield Viscometer, No. 4 spindle, 30 rpm at 25° C. The dispersion was dissolved to give a standard viscosity (SV) of 2.56 cps.

EXAMPLES 2–8

Additional aqueous dispersions were prepared in the same manner as Example 1, showing the effect of various polymer and ammonium sulfate salt levels on bulk viscosity as shown in Table 1.

TABLE 1

| Example No. | % TOTAL SOLIDS | FIRST POLYMER % SOLIDS | SECOND POLYMER % SOLIDS | % SALT | BV (cps) | SV (cps) |
|---|---|---|---|---|---|---|
| 1 | 30 | 24 | 6 | 13.5 | 2,250 | 2.56 |
| 2 | 30 | 24 | 6 | 12.5 | 6,600 | 2.2 |
| 3 | 30 | 24 | 6 | 13 | 6,000 | 2.37 |
| 4 | 30 | 24 | 6 | 13.5 | 2,960 | 2.3 |
| 5 | 30 | 24 | 6 | 13.5 | 2,300 | 2.35 |
| 6 | 30 | 25 | 5 | 13.5 | 2,640 | 2.61 |
| 7 | 30 | 24 | 6 | 14 | 3,470 | 2.39 |
| 8 | 30 | 24 | 6 | 15 | 7,080 | 2.17 |

EXAMPLE 9

A suitable vessel equipped with a mechanical stirrer, reflux condenser, thermocouple and a nitrogen inlet was charged with 72.60 parts of deionized water and 30.8 parts of a 40% aqueous solution of poly(DMAEM.MeCl), weight average molecular weight about 222,600. After dissolution was complete, 24.37 parts of a 53.33% aqueous solution of acrylamide and 45.93 parts of a 79% aqueous solution of DEAEA.DMS were added and mixed. To this mixture, 31.9 pans ammonium sulfate, 2.57 pans citric acid, and 6.9 pans of 1% solution of EDTA were added and mixed. The pH of the mixture was about 3.3. The vessel was sealed and sparged with nitrogen for 30 minutes, and then polymerization was started by adding 4.93 parts of 1% solution of V-50. The reaction mixture was heated to 40° C. for 2 hours and then raised to and held at 50° C. for 4 hours. The overall conversion was greater than 99%. A stable fluid aqueous dispersion was obtained. The bulk viscosity of this dispersion was about 1460 cps showing preferable fluidity as measured with a Brookfield Viscometer, No. 4 spindle, 30 rpm at 25° C. The dispersion was dissolved to give a SV of 2.40 cps.

EXAMPLES 10-33

Additional aqueous dispersions were prepared in the same manner as Example 9 demonstrating the effect of total polymer solids, ratio of first cationic to second cationic polymer, second cationic polymer molecular weight, and ammonium sulfate salt level on the bulk viscosity (BV) of the aqueous dispersion, as shown in Table 2.

45.20 parts of an 80% aqueous solution of DEAEA.DMS and 38.7 pans of 1% aqueous solution of tertiary butyl acrylamide were added and mixed. To this mixture, 49.28 pans ammonium sulfate, 2.57 pans citric acid, and 3.45 pans of 2% EDTA were added and mixed. The pH of the mixture was about 3.3. The vessel was sealed and sparged with nitrogen for 30 minutes, and then polymerization was started by adding 2.46 pans of 2% V-50. The reaction mixture was

TABLE 2

| EXAMPLE NO. | % TOTAL SOLIDS | FIRST POLYMER % SOLIDS | SECOND POLYMER % SOLIDS | SECOND POLYMER MW | % SALT | BV (cps) | SV (cps) |
|---|---|---|---|---|---|---|---|
| 9  | 28 | 22.4  | 5.6  | 222,600 | 14.5 | 1,460 | 2.40 |
| 10 | 28 | 22.4  | 5.6  | 194,000 | 14.5 | 2,250 | 2.52 |
| 11 | 28 | 22.4  | 5.6  | 199,300 | 14.5 | 1,440 | 2.52 |
| 12 | 28 | 22.4  | 5.6  | 172,870 | 14.5 | 2,940 | 2.61 |
| 13 | 28 | 22.4  | 5.6  | 221,500 | 14.5 | 1,970 | 2.52 |
| 14 | 28 | 22.4  | 5.6  | 159,000 | 14.5 | 2,740 | 2.59 |
| 15 | 28 | 22.4  | 5.6  | 145,000 | 14.5 | 2,920 | 2.65 |
| 16 | 28 | 22.4  | 5.6  | 199,300 | 14.5 | 2,150 | 2.86 |
| 17 | 30 | 24    | 6    | 242,900 | 13.5 | 2,620 | 2.49 |
| 18 | 30 | 24    | 6    | 230,600 | 13.5 | 3,710 | 2.4  |
| 19 | 30 | 24    | 6    | 230,600 | 14   | 2,200 | 2.39 |
| 20 | 30 | 24    | 6    | 230,600 | 14.5 | 1,800 | 2.54 |
| 21 | 30 | 24    | 6    | 230,600 | 15   | 3,260 | 2.49 |
| 22 | 28 | 22.4  | 5.6  | 230,600 | 15   | 982   | 2.49 |
| 23 | 28 | 22.4  | 5.6  | 230,600 | 15.5 | 900   | 2.45 |
| 24 | 28 | 23.5  | 4.5  | 230,600 | 15.5 | 1,380 | 2.77 |
| 25 | 27 | 22.66 | 4.34 | 230,600 | 15.5 | 1,600 | 2.61 |
| 26 | 27 | 22.66 | 4.34 | 230,600 | 16   | 1,770 | 2.82 |
| 27 | 30 | 24    | 6    | 230,600 | 14.5 | 1,770 | 2.43 |
| 28 | 28 | 22.4  | 5.6  | 230,600 | 15.5 | 1,820 | 2.56 |
| 29 | 28 | 22.4  | 5.6  | 230,600 | 16   | 3,120 | 2.44 |
| 30 | 28 | 23    | 5    | 230,600 | 15   | 1,620 | 2.5  |
| 31 | 28 | 23    | 5    | 230,600 | 15.5 | 962   | 2.67 |
| 32 | 28 | 23    | 5    | 230,600 | 16   | 1,500 | 2.59 |
| 33 | 28 | 22.4  | 5.6  | 230,600 | 15.5 | 1,260 | 2.51 |

EXAMPLE 34

This polymerization was carried out in the same manner as Example 9, except that a poly(DMAEM.MeCl) having a weight average molecular weight of about 395,000 was used. A stable fluid aqueous dispersion was obtained. The bulk viscosity of this aqueous dispersion was about 5100 cps showing preferable fluidity as measured with a Brookfield Viscometer, No. 4 spindle, 30 rpm at 25° C. The dispersion was dissolved to give a SV of 2.35 cps.

EXAMPLE 35

This polymerization was carried out in the same manner as Example 34, except that 2.46 parts of 10% glycerol solution was added. Polymerization proceeded smoothly. A stable fluid aqueous dispersion was obtained. The bulk viscosity of this dispersion was about 3700 cps as measured with a Brookfield Viscometer, No. 4 spindle, 30 rpm at 25° C. showing improved fluidity. The bulk viscosity was greatly reduced relative to Example 34, demonstrating the viscosity-reducing effect of the glycerol additive. The dispersion was dissolved to give a SV of 2.35 cps.

EXAMPLE 36

A suitable vessel equipped with a mechanical stirrer, reflux condenser, thermocouple and nitrogen inlet tube was charged with 39.73 pans deionized water and 30.1 pans of 41% poly(DMAEM.MeCl), weight average molecular weight about 395,000. After completion of dissolution, 23.77 pans of a 53.57% aqueous solution of acrylamide, raised to 40° C. for 2 hours and then raised to 50° C. for an additional 4 hours. The overall conversion was greater than 99%. A stable fluid aqueous dispersion was obtained. The bulk viscosity of this aqueous dispersion was about 1900 cps as measured with a Brookfield Viscometer No. 4 spindle, 30 rpm at 25° C., showing improved fluidity compared to Example 34 and demonstrating the effect of incorporating hydrophobic recurring units of tertiary butyl acrylamide. The aqueous dispersion was dissolved to give a SV of 2.32 cps.

EXAMPLE 37

A suitable vessel equipped with a mechanical stirrer, reflux condenser, thermocouple and nitrogen inlet robe was charged with 78.84 parts deionized water and 30.1 parts of 41% poly(DMAEM.MeCl), weight avenge molecular weight about 395,000. After completion of dissolution, 20.95 parts of a 53.57% aqueous solution of acrylamide, 42.73 parts of a 80% aqueous solution of DEAEA.DMS and 4.84 parts of a 80% aqueous solution of the benzyl chloride quaternary salt of dimethylaminoethyl acrylate (DMAEA.BzCl) were added and mixed. To this mixture, 49.28 parts ammonium sulfate, 2.57 parts citric acid, and 3.45 parts of 2% EDTA were added and mixed. The pH of the mixture was about 3.3. The vessel was sealed and sparged with nitrogen for 30 minutes, and then polymerization was started by adding 2.46 parts of 2% V-50. The reaction mixture was raised to 40° C. for 2 hours, and then raised to and held at 50° C. for 4 hours. The overall conversion was greater than 99%. A stable fluid aqueous dispersion was obtained. The bulk viscosity of this dispersion was about 3840 cps as measured with a Brookfield Viscometer No. 4 spindle, 30 rpm at 25° C. showing preferable fluidity. The dispersion was dissolved to give a SV of 2.14 cps.

EXAMPLE 38

A suitable vessel with an external jacket for heating or cooling was equipped with a mechanical stirrer, reflux condenser, thermocouple and nitrogen inlet tube. The vessel was charged with 294.47 pans deionized water and 117.60 parts of 40% aqueous solution of poly(DMAEM.MeCl), weight average molecular weight about 210,000. After completion of dissolution, 94.03 parts of a 52.77% aqueous solution of acrylamide and 173.18 parts of an 80% aqueous solution of DEAEA.DMS were added and mixed. To this mixture, 130.20 parts ammonium sulfate, 9.83 parts citric acid, and 13.17 pans of 2% EDTA were added and mixed. The pH of the mixture was about 3.3. The vessel was sealed and sparged with nitrogen for 30 minutes, and then polymerization was started by adding 7.53 parts of 1% V-50. The reaction mixture was heated to 40° C. for 2 hours and then raised to and held at 50° C. for 4 hours. The overall conversion was greater than 99%. A stable fluid aqueous dispersion was obtained. The bulk viscosity of this dispersion was about 760 cps as measured with a Brookfield Viscometer No. 4 spindle, 30 rpm at 25° C. showing preferable fluidity. The dispersion was dissolved to give a SV of 2.52 cps.

EXAMPLE 39

A suitable vessel equipped with a mechanical stirrer, reflux condenser, thermocouple and nitrogen inlet tube was charged with 63.18 parts deionized water and 30.8 parts of 40% aqueous solution of poly(DMAEM.MeCl), weight average molecular weight about 230,600. After completion of dissolution, 27.96 parts of a 53.33% aqueous solution of acrylamide (AMD), 26.02 parts of a 80% aqueous solution of DEAEA.DMS and 16.94 parts of a 80% aqueous solution of the methyl chloride quaternary salt of dimethylaminoethylacrylate (DMAEA.MeCl) were added and mixed. To this mixture, 40.7 parts ammonium sulfate, 2.57 parts citric acid, and 6.9 parts of 1% EDTA were added and mixed. The pH of the mixture was about 3.3. The vessel was sealed and sparged with nitrogen for 30 minutes, and then polymerization was started by adding 4.93 parts of 1% V-50. The reaction mixture was raised to 40° C. for 2 hours, and then raised to and held at 50° C. for 4 hours. The overall conversion was greater than 99%. A stable fluid aqueous dispersion was obtained. The bulk viscosity of this dispersion was about 3840 cps as measured with a Brookfield Viscometer, No. 4 spindle, 30 rpm at 25° C. showing good fluidity. The dispersion was dissolved to give a SV of 2.14 cps.

EXAMPLES 40–42

Polymerizations were carried out in the same manner as Example 39 except that the bulk viscosity was adjusted by varying the level of ammonium sulfate salt as shown in Table 3. These Examples demonstrate that aqueous dispersions having low bulk viscosities and high polymer solids may be prepared, wherein the first cationic polymer is a DMAEA.MeCl/DEAEA.DMS/AMD terpolymer.

TABLE 3

| EXAMPLE NO. | % TOTAL SOLIDS | FIRST POLYMER % SOLIDS | SECOND POLYMER % SOLIDS | % SALT | BV (cps) | SV (cps) |
|---|---|---|---|---|---|---|
| 39 | 28 | 22.4 | 5.6 | 18.5 | 2,620 | 2.99 |
| 40 | 28 | 22.4 | 5.6 | 18 | 4,310 | 2.96 |
| 41 | 28 | 22.4 | 5.6 | 19 | 1,820 | 2.65 |
| 42 | 28 | 22.4 | 5.6 | 19.5 | 2,000 | 2.62 |

EXAMPLE 43

A suitable vessel equipped with an external jacket for heating or cooling, a mechanical stirrer, reflux condenser, thermocouple and nitrogen inlet tube was charged with 260.35 parts deionized water and 117.6 parts of a 40% aqueous solution of poly(DMAEM.MeCl), weight average molecular weight about 210,000. After completion of dissolution, 107.89 parts of a 52.77% aqueous solution of acrylamide, 99.35 pans of a 80% aqueous solution of DEAEA.DMS and 64.68 parts of a 80% aqueous solution of DMAEA.MeCl were added and mixed. To this mixture, 271.92 parts ammonium sulfate, 9.83 parts citric acid, and 13.17 parts of 2% EDTA were added and mixed. The pH of the mixture was about 3.3. The vessel was sealed and sparged with nitrogen for 30 minutes, and then polymerization was started by adding 7.53 parts of 2.5% V-50. The reaction mixture was raised to 40° C. for 2 hours, and then raised to and held at 50° C. for 4 hours. The overall conversion was greater than 99%. A stable fluid aqueous dispersion was obtained. The bulk viscosity of this dispersion was about 1240 cps as measured with a Brookfield Viscometer, No. 4 spindle, 30 rpm at 25° C. showing good fluidity. The dispersion was dissolved to give a SV of 2.74 cps.

EXAMPLE 44

A suitable vessel equipped with a mechanical stirrer, reflux condenser, and nitrogen inlet tube was charged with 18.86 parts deionized water and 9 parts of a 40% aqueous solution of Poly(DMAEM.MeCl), weight average molecular weight about 200,000. After completion of dissolution, 4.39 parts of a 53.64% aqueous solution of acrylamide and 15.19 parts of a 79.3% aqueous solution of DEAEA.DMS were added and mixed. To this mixture, 8.4 parts ammonium sulfate, 0.7 parts citric acid, and 2.02 parts of 1% EDTA were added and mixed. The pH of the mixture was about 3.3. The vessel was sealed and sparged with nitrogen for 30 minutes, and then polymerization was started by adding 1.44 parts of 1% V-50. The reaction mixture was raised to 40° C. for 2 hours and then raised to and held at 50° C. for 8 hours. The conversion was greater than 99%. A stable fluid aqueous dispersion was obtained. The bulk viscosity of this dispersion was about 850 cps as measured with a Brookfield Viscometer, No. 4 spindle, 30 rpm at 25° C. showing preferable fluidity. The dispersion was dissolved to give a SV of 2.27 cps.

EXAMPLES 45–49

Additional aqueous dispersions were prepared in the same manner as Example 44, demonstrating the effect of ratio of first cationic to second cationic polymer and salt content on the bulk viscosity of the dispersion as shown in Table 4.

TABLE 4

| EXAMPLE NO. | % TOTAL SOLIDS | FIRST POLYMER % SOLIDS | SECOND POLYMER % SOLIDS | % SALT | BV (cps) | SV (cps) |
|---|---|---|---|---|---|---|
| 44 | 30 | 24 | 6 | 14 | 852 | 2.27 |
| 45 | 30 | 24 | 6 | 12 | 2,400 | 2.19 |
| 46 | 30 | 24 | 6 | 13 | 1,100 | 2.34 |
| 47 | 30 | 24 | 6 | 15 | 1,770 | 2.35 |
| 48 | 30 | 25 | 5 | 13 | 1,260 | 2.45 |
| 49 | 30 | 25 | 5 | 14 | 4,750 | 2.4 |
| 50 | 30 | 24 | 6* | 14 | 780 | 2.2 |

*Molecular weight of second polymer was about 222,600.

EXAMPLE 51

A suitable vessel equipped with a mechanical stirrer, reflux condenser, and nitrogen inlet tube was charged with 92.9 parts deionized water and 30.1 parts of a 41% aqueous solution of poly(DMAEM.MeCl), weight average molecular weight about 395,000. After completion of dissolution, 15.03 parts of a 53.57% aqueous solution of acrylamide and 51.53 parts of an 80% aqueous solution of DEAEA.DMS were added and mixed. To this mixture 22 parts of sodium sulfate, 2.57 parts citric acid, and 3.45 parts of 2% EDTA were added and mixed. The pH of the mixture was about 3.3. The vessel was sealed and sparged with nitrogen for 30 minutes, and then polymerization was started by adding 2.46 parts of 2% V-50. The reaction mixture was raised to 40° C. for 2 hours and then raised to and held at 50° C. for 4 hours. The overall conversion was greater than 99%. A stable fluid aqueous dispersion was obtained. The bulk viscosity of this dispersion was about 1100 cps as measured with a Brookfield Viscometer, No. 4 spindle, 30 rpm at 25° C. The dispersion was dissolved to give a SV of 2.19 cps. This Example demonstrates the effectiveness of sodium sulfate.

EXAMPLE 52

A suitable vessel equipped with a mechanical stirrer, reflux condenser, thermocouple and nitrogen inlet tube was charged with 17.57 parts deionized water and 9 parts of a 40% aqueous solution of poly(DMAEM.MeCl), weight average molecular weight about 200,000. After completion of dissolution, 4.77 parts of a 53.64% aqueous solution of acrylamide, 12 parts of a 79.3% aqueous solution of DEAE-A.DMS and 2.91 parts of an 80% aqueous solution of DMAEA.MeCl were added and mixed. To this mixture, 9.6 parts ammonium sulfate, 0.7 parts citric acid, and 2.02 parts of 1% EDTA were added and mixed. The pH of the mixture was about 3.3. The vessel was sealed and sparged with nitrogen for 30 minutes, and then polymerization was started by adding 1.44 parts of 1% V-50. The reaction mixture was raised to 40° C. for 2 hours and then raised to and held at 50° C. for 4 hours. The overall conversion was greater than 99%. A stable fluid aqueous dispersion was obtained. The bulk viscosity of this dispersion was about 800 cps as measured with a Brookfield Viscometer, No. 4 spindle, 30 rpm at 25° C. showing good fluidity. The dispersion was dissolved to give a SV of 2.3 cps.

EXAMPLES 53–80

Polymerizations were carried out in the same manner as Example 52. The effect of total polymer solids, first cationic polymer composition (in terms of % AMD, % DEAE-A.DMS and % DMAEA.MeCl in monomer feed), ratio of first cationic to second cationic polymer, and ammonium sulfate salt content on the bulk viscosity of the aqueous dispersion is demonstrated as shown in Table 5.

TABLE 5

| NO. | % AMD | % DEAEA.DMS | % DMAEA.MeCl | % TOTAL SOLIDS | FIRST POLYMER % SOLIDS | SECOND POLYMER % SOLIDS | % SALT | BV (cps) | SV (cps) |
|---|---|---|---|---|---|---|---|---|---|
| 52 | 45 | 40 | 15 | 30 | 24 | 6 | 16 | 802 | 2.3 |
| 53 | 45 | 40 | 15 | 30 | 24 | 6 | 12 | 200,000+ | 2.4 |
| 54 | 45 | 40 | 15 | 30 | 24 | 6 | 13 | 30,900 | 2.35 |
| 55 | 45 | 40 | 15 | 30 | 24 | 6 | 14 | 4,410 | 2.35 |
| 56 | 45 | 40 | 15 | 30 | 24 | 6 | 15 | 1,080 | 2.42 |
| 57 | 45 | 40 | 15 | 30 | 24 | 6 | 17 | 1,820 | 2.32 |
| 58 | 45 | 40 | 15 | 30 | 24 | 6 | 18 | 15,800 | 2.2 |
| 59 | 45 | 40 | 15 | 30 | 24 | 6 | 19 | 200,000+ | |
| 60 | 45 | 40 | 15 | 30 | 25 | 5 | 15 | 1,940 | 2.45 |
| 61 | 45 | 40 | 15 | 30 | 25 | 5 | 16 | 1,260 | 2.49 |
| 62 | 45 | 40 | 15 | 30 | 25 | 5 | 17 | 6,010 | 2.4 |
| 63 | 45 | 35 | 20 | 30 | 24 | 6 | 15 | 3,120 | 2.19 |
| 64 | 45 | 35 | 20 | 30 | 24 | 6 | 16 | 1,340 | 2.24 |
| 65 | 45 | 35 | 20 | 30 | 24 | 6 | 17 | 1,140 | 2.32 |
| 66 | 45 | 30 | 25 | 30 | 24 | 6 | 16 | 170,000 | 1.82 |
| 67 | 45 | 30 | 25 | 30 | 24 | 6 | 17 | 1,890 | 2.44 |
| 68 | 45 | 30 | 25 | 30 | 24 | 6 | 18 | 1,400 | 2.35 |
| 69 | 45 | 20 | 35 | 29.3 | 23.44 | 5.86 | 18 | 200,000+ | |
| 70 | 45 | 20 | 35 | 29.3 | 23.44 | 5.86 | 18.5 | 2,900 | 2.4 |
| 71 | 45 | 20 | 35 | 29.3 | 23.44 | 5.86 | 19 | 6,600 | 2.24 |
| 72 | 45 | 10 | 45 | 28.5 | 22.8 | 5.7 | 18 | 200,000+ | 2.35 |
| 73 | 45 | 10 | 45 | 28.5 | 22.8 | 5.7 | 19 | 200,000+ | 2.34 |
| 74 | 45 | 10 | 45 | 28 | 22.4 | 5.6 | 19.6 | 200,000+ | 2.5 |
| 75 | 45 | 20 | 35 | 29 | 23.2 | 5.8 | 18 | 200,000+ | 2.2 |
| 76 | 45 | 20 | 35 | 29 | 23.2 | 5.8 | 18.5 | 5,540 | 2.27 |
| 77 | 45 | 20 | 35 | 29 | 23.2 | 5.8 | 19 | 3,570 | 2.47 |
| 78 | 45 | 20 | 35 | 28.5 | 23.2 | 5.8 | 18 | 6,350 | 2.35 |
| 79 | 45 | 20 | 35 | 28.5 | 23.2 | 5.8 | 18.5 | 3,060 | 2.4 |
| 80 | 45 | 20 | 35 | 28.5 | 23.2 | 5.8 | 19 | 200,000+ | 2.39 |

EXAMPLE 81

A suitable vessel equipped with a mechanical stirrer, reflux condenser, thermocouple and nitrogen inlet tube was charged with 89 parts deionized water and 20.9 parts of a 40% aqueous solution of poly(DMAEM.MeCl), weight average molecular weight about 190,000. After completion of dissolution, 30.96 parts of a 52.77% aqueous solution of acrylamide and 21.38 parts of a 80% aqueous solution of DEAEA.DMS were added and mixed. To this mixture, 49.5 parts ammonium sulfate, 2.57 parts citric acid, and 2.34 parts of 1% EDTA were added and mixed. The pH of the mixture was about 3.3. The vessel was sealed and sparged with nitrogen for 30 minutes, and then polymerization was started by adding 3.34 parts of 1% V-50. The reaction mixture was raised to 40° C. for 2 hours and then raised to and held at 50° C. for 4 hours. The combined conversion was greater than 99%. A stable fluid aqueous dispersion was obtained. The bulk viscosity of this dispersion was about 280 cps as measured with a Brookfield Viscometer, No. 4 spindle, 30 rpm at 25° C. showing good fluidity. The dispersion was dissolved to give a SV of 1.60 cps.

EXAMPLES 82–97

Polymerizations were carried out in the same manner as Example 81. The effect of chelant (EDTA) concentration, chain transfer agent (lactic acid), first cationic polymer composition (in terms of % AMD, % DEAEA.DMS, and % DMAEA.MeCl in monomer feed), ratio of first cationic to second cationic polymer, and ammonium sulfate salt content on standard viscosity and bulk viscosity are demonstrated as shown in Table 6.

EXAMPLE 98

A suitable vessel equipped with a mechanical stirrer, reflux condenser, thermocouple and nitrogen inlet robe was charged with 87.97 parts deionized water and 20.9 parts of a 40% aqueous solution of poly(DMAEM.MeCl), weight average molecular weight about 190,000. After completion of dissolution, 33.99 parts of a 52.77% aqueous solution of acrylamide, 11.74 parts of a 80% aqueous solution of DEAEA.DMS and 7.64 parts of a 80% aqueous solution of DMAEA.MeCl were added and mixed. To this mixture, 49.5 parts ammonium sulfate, 2.57 parts citric acid, and 2.34 g of 2% EDTA were added and mixed. The pH of the mixture was about 3.3. The vessel was sealed and sparged with nitrogen for 30 minutes, and then polymerization was started by adding 2.34 parts of 1% V-50. The reaction mixture was raised to 40° C. for 2 hours and then raised to and held at 50° C. for 4 hours. The overall conversion was greater than 99%. A stable fluid aqueous dispersion was obtained. The bulk viscosity of this dispersion was about 760 cps as measured with a Brookfield Viscometer, No. 4 spindle, 30 rpm at 25° C. The dispersion was dissolved to give a SV of 2.09 cps.

EXAMPLES 99–100

Polymerizations were carried out in the same manner as Example 97. The effect of chain transfer agent (lactic acid) concentration on bulk viscosity is demonstrated as shown in Table 7.

TABLE 6

| NO. | % AMD | % DEAEA.DMS | % DMAEA.MeCl | % TOTAL SOLIDS | FIRST POLYMER % SOLIDS | SECOND POLYMER % SOLIDS | % LACTIC ACID | EDTA (ppm) | % SALT | BV (cps) | SV (cps) |
|---|---|---|---|---|---|---|---|---|---|---|---|
| 81 | 80 | 20 |    | 19 | 15.2 | 3.8  | 0    | 1400 | 22.5 | 280     | 1.6  |
| 82 | 80 | 20 |    | 20 | 16   | 4    | 0    | 1400 | 20   | 142,000 | 1.82 |
| 83 | 80 | 20 |    | 20 | 16   | 4    | 0    | 1400 | 22.5 | 840     | 1.6  |
| 84 | 80 | 20 |    | 19 | 15.2 | 3.8  | 0.25 | 1400 | 22.5 | 200     | 2.05 |
| 85 | 80 | 20 |    | 19 | 15.2 | 3.8  | 0.5  | 1400 | 22.5 | 100     | 1.67 |
| 86 | 80 | 20 |    | 19 | 15.2 | 3.8  | 0.75 | 1400 | 22.5 | 200     | 1.87 |
| 87 | 80 | 20 |    | 19 | 15.2 | 3.8  | 0    | 2000 | 22.5 | 280     | 1.61 |
| 88 | 80 | 20 |    | 19 | 15.2 | 3.8  | 0    | 3000 | 22.5 | 4,800   | 1.81 |
| 89 | 80 | 20 |    | 19 | 15.2 | 3.8  | 0.25 | 2000 | 22.5 | 270     | 1.99 |
| 90 | 80 | 20 |    | 19 | 15.2 | 3.8  | 0.5  | 2000 | 22.5 | 2,000   | 2.47 |
| 91 | 80 | 20 |    | 19 | 15.2 | 3.8* | 0.5  | 2000 | 22.5 | 140     | 2.1  |
| 92 | 80 | 20 |    | 19 | 15.2 | 3.8  | 0.5  | 2000 | 22.5 | 640     | 2.45 |
| 93 | 80 | 20 |    | 19 | 15.2 | 3.8  | 0.65 | 2000 | 22.5 | 360     | 2.4  |
| 94 | 80 | 20 |    | 19 | 15.2 | 3.8  | 0.75 | 2000 | 22.5 | 225     | 2.35 |
| 95 | 80 | 10 | 10 | 19 | 15.2 | 3.8  | 0    | 1400 | 22.5 | 760     | 2.09 |
| 96 | 80 | 10 | 10 | 19 | 15.2 | 3.8  | 0.25 | 1400 | 22.5 | 460     | 2.86 |
| 97 | 80 | 10 | 10 | 19 | 15.2 | 3.8  | 0.5  | 1400 | 22.5 | 340     | 2.74 |

*Molecular weight of second polymer was about 222,600.

TABLE 7

| EXAMPLE NO. | % TOTAL SOLIDS | FIRST POLYMER % SOLIDS | SECOND POLYMER % SOLIDS | LACTIC ACID % | % SALT | BV (cps) | SV (cps) |
|---|---|---|---|---|---|---|---|
| 98 | 19 | 15.2 | 3.8 | 0 | 22.5 | 760 | 2.09 |
| 99 | 19 | 15.2 | 3.8 | 0.25 | 22.5 | 460 | 2.86 |
| 100 | 19 | 15.2 | 3.8 | 0.5 | 22.5 | 340 | 2.74 |

EXAMPLE 101

A suitable vessel equipped with a mechanical stirrer, reflux condenser, thermocouple and nitrogen inlet tube was charged with 82.15 parts deionized water and 30.8 parts of a 20% aqueous solution of poly(diallyldimethylammonium chloride) (poly(DADMAC)), weight average molecular weight about 289,000. After completion of dissolution, 48.24 parts of a 52.77% aqueous solution of acrylamide and 13.27 parts of an 80% aqueous solution of DEAEA.DMS were added and mixed. To this mixture, 49.5 parts ammonium sulfate, 2.57 parts citric acid, 1.67 parts of 10% lactic acid, and 3.34 parts of 2% EDTA were added and mixed. The pH of the mixture was about 3.3. The vessel was sealed and sparged with nitrogen for 30 minutes, and then polymerization was started by adding 3.34 parts of 1% V-50. The reaction mixture was raised to 40° C. for 2 hours and then raised to and held at 50° C. for 4 hours. The combined conversion was greater than 99%. A stable fluid aqueous dispersion was obtained. The bulk viscosity of this dispersion was about 960 cps as measured with a Brookfield Viscometer, No. 4 spindle, 30 rpm at 25° C. showing preferable fluidity. The dispersion was dissolved to give a SV of 3.67 cps. This Example demonstrates aqueous dispersions having poly(DADMAC) as the second cationic polymer.

EXAMPLE 102

A suitable vessel equipped with an external jacket for heating or cooling, mechanical stirrer, reflux condenser, thermocouple and nitrogen inlet tube was charged with 262.6 parts deionized water, 47.4 parts of a 40% aqueous solution of poly(DMAEM.MeCl), weight average molecular weight about 41,500, and 92.60 parts of a 40% aqueous solution of poly(DMAEM.MeCl), weight average molecular weight about 205,000. After completion of dissolution, 88.1 parts of a 53.12% aqueous solution of acrylamide and 133.9 parts of a 72.6% aqueous solution of the methyl chloride quaternary salt of diethylaminoethylacrylate (DEAEA.MeCl) were added and mixed. To this mixture, 144 parts ammonium sulfate, 2.644 parts citric acid, and 14.4 parts of 1% EDTA were added and mixed. The pH of the mixture was about 3.3. The vessel was sealed and sparged with nitrogen for 30 minutes, and then polymerization was started by adding 14.4 parts of 2% V-50. The reaction mixture was raised to and held at 40°–45° C. for 6 hours. The conversion was greater than 99.9%. A stable fluid aqueous dispersion was obtained. The bulk viscosity of this dispersion was about 2,200 cps as measured with a Brookfield Viscometer, No. 4 spindle, 30 rpm at 25° C. The dispersion was dissolved to give a SV of 3.31 cps. This Example demonstrates an aqueous dispersion having a third cationic polymer.

EXAMPLE 103

Polymerization was carried out in the same manner as Example 102, except that the two poly(DMAEM.MeCl) polymers were replaced with a single poly(DMAEM.MeCl) having a weight average molecular weight of about 1,500,000. The bulk viscosity of this dispersion was about 8,000 cps as measured with a Brookfield Viscometer, No. 4 spindle, 30 rpm at 25° C. showing preferable fluidity. The dispersion was dissolved to give a SV of 2.45 cps.

EXAMPLE 104

A suitable vessel equipped with an external jacket for heating, mechanical stirrer, reflux condenser, thermocouple and nitrogen inlet tube was charged with 23.8 parts deionized water and 25.3 parts of a 20% aqueous solution of poly(DADMAC), weight average molecular weight about 289,000. After completion of dissolution, 7.9 parts of a 53.1% aqueous solution of acrylamide and 11.3 parts of a 77.9% aqueous solution of DEAEA.MeCl were added and mixed. To this mixture, 18 parts ammonium sulfate, 1.08 parts citric acid, 0.37 part of 5% EDTA, and 0.9 part glycerol were added and mixed. The pH of the mixture was about 3.3. The vessel was sealed and sparged with nitrogen for 30 minutes, and then polymerization was started by adding 1.3 parts of 1% V-50 at 40° C. This temperature was held for 2 hours and then was raised to 50° C. and maintained at this temperature for 8 hours. The residual acrylamide level was about 209 parts per million (ppm). A stable fluid aqueous dispersion was obtained. The bulk viscosity of this dispersion was about 2,950 cps as measured with a Brookfield Viscometer, No. 4 spindle, 30 rpm at 25° C. showing preferable fluidity. The dispersion was dissolved to give a SV of 2.47 cps.

EXAMPLES 105–108

Polymerizations were carried out in the same manner as Example 104, except that part of the poly(DADMAC) was replaced with a poly(DADMAC) polymer having a lower weight average molecular weight. The effect on the aqueous dispersion bulk viscosity of including the third polymer is shown in Table 8.

TABLE 8

| NO. | % TOTAL SOLIDS | FIRST POLYMER % SOLIDS | SECOND POLYMER % SOLIDS | SECOND POLYMER MW | THIRD POLYMER % SOLIDS | THIRD POLYMER MW | % SALT | BV (cps) | SV (cps) |
| --- | --- | --- | --- | --- | --- | --- | --- | --- | --- |
| 104 | 21.2 | 14.5 | 5.06 | 289,000 | | | 20 | 2,950 | 2.47 |
| 105 | 21.2 | 14.5 | 3.73 | 289,000 | 1.89 | 10,100 | 20 | 2,200 | 2.4 |
| 106 | 21.2 | 14.5 | 3.73 | 289,000 | 1.89 | 53,400 | 20 | 1,950 | 2.4 |
| 107 | 21.2 | 14.5 | 3.73 | 289,000 | 1.89 | 67,900 | 20 | 2,020 | 2.39 |
| 108 | 21.2 | 14.5 | 3.73 | 289,000 | 1.89 | 100,000 | 20 | 1,990 | 2.42 |

EXAMPLE 109

An aqueous dispersion containing 12.5% ammonium sulfate and having a polymer solids of 30%, a bulk viscosity of about 7200 cps and a standard viscosity of about 2.34 cps was prepared in the same manner as in Example 2.

EXAMPLE 110

An aqueous dispersion containing 15.5% ammonium sulfate and having a polymer solids level of 28%, a bulk viscosity of about 2640 cps and a standard viscosity of about 2.4 cps was prepared in the same manner as in Example 9.

EXAMPLES 111–133

Various amounts of either ammonium sulfate, sodium thiocyanate, or 1,3-benzenedisulfonate (1,3-BDS) were added to the base aqueous dispersions of Example 109, Example 110, Example 103, Example 1, Example 102 and Example 142. The bulk viscosities of the resultant aqueous dispersions were further reduced as shown in Table 9. These Examples demonstrate that the bulk viscosity of aqueous dispersions may be reduced by adding salt to the dispersion, and that the addition of 1,3-BDS may be more effective than ammonium sulfate on a weight basis. Substantially similar results are obtained by polymerizing the monomers in the presence of the salts.

TABLE 9

| Example No. | Base Aqueous Dispersion | BV of Base Aqueous Dispersion | Added Salt | % Total Salt | % Total Solids | BV (cps) |
| --- | --- | --- | --- | --- | --- | --- |
| 111 | Example 109 | 7200 | $(NH_4)_2SO_4$ | 14.21 | 29.41 | 2100 |
| 112 | Example 109 | 7200 | $(NH_4)_2SO_4$ | 15.86 | 28.84 | 1,000 |
| 113 | Example 109 | 7200 | $(NH_4)_2SO_4$ | 17.45 | 28.3 | 501 |
| 114 | Example 109 | 7200 | $(NH_4)_2SO_4$ | 19 | 27.8 | 319 |
| 115 | Example 109 | 7200 | 1,3-BDS | 13.37 | 29.7 | 2200 |
| 116 | Example 109 | 7200 | 1,3-BDS | 14.21 | 29.41 | 1160 |
| 117C | Example 109 | 7200 | 1,3-BDS | 15 | 29.12 | FL |
| 118 | Example 110 | 2640 | NaSCN | 16.3 | 27.7 | 540 |
| 119C | Example 110 | 2640 | NaSCN | 17.15 | 27.45 | FL |
| 120C | Example 110 | 2640 | NaSCN | 17.96 | 27.18 | FL |
| 121 | Example 103 | 8000 | 1,3-BDS | 19.6 | 24.51 | 1660 |
| 122 | Example 103 | 8000 | 1,3-BDS | 21.15 | 24.04 | 762 |
| 123 | Example 103 | 8000 | 1,3-BDS | 22.64 | 23.58 | FL |
| 124 | Example 103 | 8000 | $(NH_4)_2SO_4$ | 19.6 | 24.51 | 3440 |
| 125 | Example 103 | 8000 | $(NH_4)_2SO_4$ | 21.15 | 24.04 | 1990 |
| 126 | Example 103 | 8000 | $(NH_4)_2SO_4$ | 22.64 | 23.58 | 1300 |
| 127 | Example 103 | 8000 | $(NH_4)_2SO_4$ | 24.07 | 23.15 | 982 |
| 128 | Example 1 | 2300 | $(NH_4)_2SO_4$ | 19 | 27.8 | 501 |
| 129 | Example 102 | 2200 | $(NH_4)_2SO_4$ | 19.6 | 24.51 | 1002 |
| 130 | Example 102 | 2200 | $(NH_4)_2SO_4$ | 21.15 | 14.04 | 441 |
| 131 | Example 102 | 2200 | $(NH_4)_2SO_4$ | 22.64 | 23.58 | 301 |
| 132 | Example 102 | 2200 | $(NH_4)_2SO_4$ | 24.07 | 23.15 | 200 |
| 133 | Example 142 | 10,000 | $(NH_4)_2SO_4$ | 24.07 | 23.15 | 1380 |

C: Comparative
FL: Formed Layers

EXAMPLE 134

About 18 parts of the aqueous dispersion of Example 49 and about 20 parts of the aqueous dispersion of Example 91 were intermixed with stirring. The resultant aqueous dispersion blend was stable and very uniform with a bulk viscosity of about 880 cps, demonstrating that differently charged dispersions may be blended to prepare an aqueous dispersion having an intermediate charge. The aqueous dispersion blend had an overall charge of about 40% and a SV of 2.5 cps.

EXAMPLE 135

About 18 parts of a high charge aqueous dispersion prepared as in Example 48 and about 18 parts of a low charge aqueous dispersion prepared as in Example 101 were intermixed with stirring. The resultant aqueous dispersion blend was stable and very uniform with a bulk viscosity of about 2300 cps, demonstrating that differently charged dispersions may be blended to prepare an aqueous dispersion having an intermediate charge. The resultant aqueous dispersion contained four different polymers.

EXAMPLE 136 (Comparative)

A polymerization was conducted in the same manner as Example 9, except that the DEAEA.DMS was replaced with an equal weight of DMAEA.MeCl. During the process of polymerization, the contents of the vessel became so viscous that stirring became impossible. The product was obtained as a gel without fluidity. This Example demonstrates that replacement of DMAEA.MeCl with DEAEA.DMS results in an aqueous dispersion having a dramatically lower bulk viscosity.

EXAMPLE 137 (Comparative)

A polymerization was conducted in the same manner as Example 50, except that the DEAEA.DMS was replaced with an equal weight of DMAEA.MeCl. During the process of polymerization, the contents of the vessel became so viscous that stirring became impossible. The product was obtained as a gel without fluidity. This Example demonstrates that replacement of DMAEA.MeCl with DEAEA.DMS results in an aqueous dispersion having a dramatically lower built viscosity.

EXAMPLE 138 (Comparative)

A polymerization was conducted in the same manner as Example 91, except that the DEAEA.DMS was replaced with an equal weight of DMAEA.MeCl. During the process of polymerization, the contents of the vessel became so viscous that stirring became impossible. The product was obtained as a gel without fluidity. This Example demonstrates that replacement of DMAEA.MeCl with DEAEA.DMS results in an aqueous dispersion having a dramatically lower bulk viscosity.

EXAMPLE 139 (Comparative)

A polymerization was conducted in the same manner as Example 100, except that the DEAEA.DMS was replaced with an equal weight of DMAEA.MeCl. During the process of polymerization, the contents of the vessel became so viscous that stirring became impossible. The product was obtained as a gel without fluidity. This Example demonstrates that replacement of DMAEA.MeCl with DEAEA.DMS results in an aqueous dispersion having a dramatically lower bulk viscosity

EXAMPLE 140

A suitable vessel equipped with a mechanical stirrer, reflux condenser, and nitrogen inlet tube was charged with 20 parts deionized water and 10.51 parts of a 40% aqueous solution of poly(DMAEM.MeCl), weight average molecular weight about 210,000. After completion of dissolution, 6.57 parts of a 53.27% aqueous solution of acrylamide, 14.56 parts of an 80% aqueous solution of DMAEA.MeCl and 4.15 parts of a 80% aqueous solution of DMAEA.BzCl were added and mixed. To this mixture, 10.8 parts ammonium sulfate, 0.4 parts citric acid, and 1.51 parts of 1% EDTA were added and mixed. The pH of the mixture was about 3.3. The vessel was sealed and sparged with nitrogen for 30 minutes, and then polymerization was started by adding 1.08 parts of 1% V-50. The reaction mixture was raised to 40° C. 2 hours by placing the vessel in a water bath and then raised to 50° C. for 6 hours. The conversion was greater than 99%. A stable fluid aqueous dispersion was obtained. The bulk viscosity of this dispersion was about 2000 cps showing preferable fluidity as measured with a Brookfield Viscometer No. 4 spindle, 30 rpm at 25° C. The dispersion was dissolved to give a SV of 2.2 cps.

EXAMPLES 141–144

Polymerizations were carried out in the same manner as Example 140. The effect of the composition of the first polymer (given in terms of % AMD), % DMAEA.MeCl, and DMAEA.BzCl in monomer feed) and molecular weight of the poly(DMAEM.MeCl) on the aqueous dispersion bulk viscosity is shown in Table 10.

TABLE 10

| NO. | % AMD | % DMAEA.MeCl | % DMAEA.BzCl | % TOTAL SOLIDS | FIRST POLYMER % SOLIDS | SECOND POLYMER % SOLIDS | SECOND POLYMER MW | % SALT | BV (cps) | SV (cps) |
|---|---|---|---|---|---|---|---|---|---|---|
| 140 | 60 | 25 | 15 | 25 | 18 | 7 | 210,000 | 18 | 2,000 | 2.2 |
| 141 | 60 | 25 | 15 | 25 | 18 | 7 | 500,000 | 18 | 13,200 | 2.34 |
| 142 | 60 | 25 | 15 | 25 | 18 | 7 | 1,500,000 | 18 | 10,000 | 2.4 |
| 143 | 60 | 25 | 15 | 25 | 18 | 7 | 800,000 | 18 | 11,500 | 2.2 |
| 144 | 60 | 29.2 | 10.8 | 25 | 19 | 6 | 200,000 | 18 | 8,680 | 2.59 |

EXAMPLES 145–150 (Comparative)

Polymerizations were carried out in the same manner as Example 140 at different ratios of AMD/DMAEA.MeCl/DMAEA.BzCl/DEAEA.DMS except that the poly(DMAEM.MeCl) was omitted. During the polymerization process, the contents of the vessel became very viscous to the point that stirring became impossible. The resulting polymerization product was obtained as a clear gel, a homogeneous composition without fluidity as shown in Table 11.

TABLE 11

| NO. | AMD | % DMAEA.MeCl | % DMAEA.BzCl | % DEAEA.DMS | % SOLIDS | % SALT | BV (cps) |
|---|---|---|---|---|---|---|---|
| 145C | 50 | 40 | 10 | | 14.4 | 20 | Gel |
| 146C | 45 | 40 | 15 | | 14.4 | 20 | Gel |
| 147C | 60 | 29.2 | 10.8 | | 18 | 18 | Gel |

TABLE 11-continued

| NO. | AMD | % DMAEA.MeCl | % DMAEA.BzCl | % DEAEA.DMS | % SOLIDS | % SALT | BV (cps) |
|---|---|---|---|---|---|---|---|
| 148C | 60 | 25 | 15 | | 18 | 18 | Gel |
| 149C | 55 | | 5 | 40 | 18 | 18 | Gel |
| 150C | 55 | | 5 | 40 | 25 | 18 | Gel |

C: Comparative

EXAMPLES 151–153

An aqueous dispersion having a bulk viscosity of about 3570 cps was prepared in the same manner as Example 13. The dispersion was concentrated by placing about 135 parts into a suitable vessel and heating to 45° C. under flowing nitrogen. A total of 26 parts of water was removed in two stages by this dehydration process. The aqueous dispersion remained stable demonstrating that dehydration is effective for achieving high solids, low bulk viscosity aqueous dispersions as shown in Table 12.

TABLE 12

| Example No. | Polymer Solids (%) | Bulk Viscosity (cps) |
|---|---|---|
| 151 (as polymerized) | 28.0 | 3570 |
| 152 | 31.5 | 660 |
| 153 | 34.6 | 3260 |

EXAMPLE 154

A suitable vessel equipped with a mechanical stirrer, reflux condenser, and a nitrogen inlet tube was charged with 277.75 parts deionized water and 112.0 parts of a 40% aqueous solution of poly(DMAEM.MeCl), weight average molecular weight about 200,000. After completion of dissolution, 89.03 parts of a 53.64% aqueous solution of acrylamide, and 164.93 parts of an 80% solution of DEAE-A.DMS were added and mixed. To this mixture, 124.0 parts ammonium sulfate, 9.36 parts citric acid, and 5.02 parts of a 1% solution of EDTA were added and mixed. The pH of the mixture was about 3.3. The contents were heated to 48° C. and sparged with nitrogen for 30 minutes, and then polymerization was started by adding 17.92 parts of 1% aqueous solution of V-50. The reaction mixture was maintained at 48° C. for 5 hours. About 3.5 hours into the polymerization the aqueous dispersion bulk viscosity began to noticeably increase. The final bulk viscosity of the aqueous dispersion was about 8,000 cps as measured with a Brookfield Viscometer No. 4 spindle, 30 rpm at 25° C.

EXAMPLE 155–156

Duplicate polymerizations ware carried out in a similar manner to Example 154 except that an additional amount of ammonium sulfate (4% on total) was added approximately 3 hours after initiation of polymerization. This prevented any substantial increase in bulk viscosity during the polymerization and resulted in a final bulk viscosity that was lower than the bulk viscosity obtained in Example 154 as shown in Table 13.

TABLE 13

| Example No. | Final Bulk Viscosity (#4 spindle, 30 rpm) |
|---|---|
| 155 | 300 cps |
| 156 | 500 cps |

EXAMPLES 157–172

General Polymerization Procedure: The following components were mixed together in a suitable vessel and the pH was adjusted to about 3.5 with a 28 wt. % solution of ammonium hydroxide.

| | |
|---|---|
| Acrylamide (55.5 wt. %) | 5.34 parts |
| DEAEA.DMS (80 wt. %) | 10.35 parts |
| Citric acid | 0.58 parts |
| Ammonium sulfate | 7.78 parts |
| poly(DMAEM.MeCl) (40 wt. %, 200,000 MW) | 7.03 parts |
| Deionized Water | 16.22 parts |
| V-50 (1 wt. %) | 1.12 parts |
| EDTA (1 wt. %) | 1.57 parts |
| Methylenebisacrylamide (MBA) | variable |
| Lactic acid (chain transfer agent) | variable |

Forty parts of the solution were placed into a suitable vessel and the solution was sparged with nitrogen. The vessel was sealed and placed into a 40° C. water bath for 2 hours. The temperature was then increased to 50° C. and maintained for an additional 3 hours. Results are summarized in Table 14, showing that substantial levels of branching agent and chain transfer agent can be incorporated into aqueous dispersions of water-soluble and water-swellable polymers. The aqueous viscosity values were obtained by dissolving or dispersing the aqueous dispersions in the same general manner as for the standard viscosity values described above, except that the polymer concentration was 0.135 wt. %.

TABLE 14

| Ex. No. | Lactic acid (wt. % on monomer) | MBA (ppm on monomer) | Dispersion bulk viscosity (#4 spindle, 30 rpm) | Aqueous Viscosity |
|---|---|---|---|---|
| 157 | 0 | 0 | — | 3.91 |
| 158 | 0.4 | 0 | — | 3.41 |
| 159 | 0.8 | 0 | — | 3.04 |
| 160 | 0 | 0 | 1100 | 3.71 |
| 161 | 0 | 2 | 1000 | 3.61 |
| 162 | 0 | 4 | 1600 | 3.66 |
| 163 | 0 | 6 | 2500 | 3.31 |
| 164 | 0 | 0 | 2200 | 3.11 |
| 165 | 0 | 10 | 3300 | 1.90 |
| 166 | 0 | 15 | 3300 | 1.77 |
| 167 | 0 | 20 | 8100 | 1.67 |
| 168 | 0 | 0 | 1200 | 2.81 |
| 169 | 0 | 30 | 1800 | 1.46 |
| 170 | 0 | 40 | 3500 | 1.43 |

TABLE 14-continued

| Ex. No. | Lactic acid (wt. % on monomer) | MBA (ppm on monomer) | Dispersion bulk viscosity (#4 spindle, 30 rpm) | Aqueous Viscosity |
| --- | --- | --- | --- | --- |
| 171 | 0 | 50 | — | 1.44 |
| 172 | 0 | 100 | — | 1.28 |

EXAMPLE 173

A aqueous dispersion was prepared as in Example 155. The aqueous dispersion had a bulk viscosity of about 240 cps and an aqueous viscosity (obtained as in Examples 157–172) of 3.55 cps.

EXAMPLE 174

The aqueous dispersion of Example 173 was spray-dried on a commercially available laboratory spray dryer. The chamber of the laboratory spray dryer was 760 millimeters (mm) in diameter with a 860 mm vertical side and a 65 degree conical bottom. Nominal gas flow through the dryer was about 180 cubic meters per hour. The aqueous dispersion feed was fed at the center of the top of the chamber using a variable speed pump, through a two-fluid nozzle using air for atomization. The outlet gas temperature was 86° C. and controlled by varying the inlet gas temperature (169° C.) and the feed rate (60 milliliters/minute). To provide an inert atmosphere, the spray-dryer was supplied with nitrogen gas from a cryogenic storage tank. The dried polymer product was discharged through the bottom of the dryer cone to a cyclone where the dry product was removed and collected. Residence time in the dryer was about 14 seconds. The resultant spray-dried polymer particles, which had a volatiles content of 3.4% and a bulk density of about 0.50 grams per cubic centimeter (g/cc), were readily soluble in water and had a SV a 3.49 cps.

EXAMPLE 175

The dissolution rate of the spray-dried polymer of Example 174 was compared to a dry polymer of similar composition obtained by spray-drying a commercial water-in-oil emulsion. Solutions were prepared in a wide mouth quart jar using a 2.5 inch magnetic stirring bar. The stirring rate was adjusted so that a deep vortex was obtained in the water. The dry polymer was added slowly over a period of 5 minutes at the edge of the vortex to avoid clumping. The spray-dried polymer of Example 174 wet more readily and completely dissolved over a period of 30–40 minutes, giving a clear solution. In contrast, the dry polymer obtained by spray-drying an inverse emulsion did not wet as rapidly and was not completely dissolved after two hours. This Example demonstrates that a dry polymer obtained by spray-drying an aqueous dispersion of the instant invention dissolved faster than a dry polymer obtained by spray-drying a corresponding water-in-oil emulsion.

EXAMPLE 176C

The procedure of U.S. Pat. No. 5,403,883 Example 1 was followed. A dispersion having a bulk viscosity of about 10,600 cps (#4 spindle, 30 rpm) was obtained.

EXAMPLE 177

The procedure of U.S. Pat. No. 5,403,883 Example 1 was followed, except that the 2-trimethlyammoniumethyl acrylate chloride was replaced by an equal weight of DEAE-A.MeCl. The resulting aqueous dispersion had a bulk viscosity of about 6,900 cps (#4 spindle, 30 rpm), demonstrating improved bulk viscosity as compared to Example 176C.

EXAMPLE 178

A suitable vessel equipped with a mechanical stirrer, reflux condenser, and a nitrogen inlet tube was charged with 22.94 parts deionized water and 10.5 parts of a 40% aqueous solution of poly(DMAEM.MeCl), weight average molecular weight about 245,000. After completion of dissolution, 6.47 parts of a 54.20% aqueous solution of acrylamide, and 7.49 parts of the propyl chloride quaternary salt of dimethylaminoethyl acrylate were added and mixed. To this mixture, 10.8 parts ammonium sulfate, 0.7 parts citric acid, and 0.76 parts of a 2% solution of EDTA were added and mixed. The pH of the mixture was about 3.3. The vessel was sealed and sparged with nitrogen for 30 minutes, and then polymerization was started by addition of 0.54 g of 2% aqueous solution of V-50. The reaction mixture was heated to 40° C. for 2 hours and then raised to 50° C. and held for an additional 4 hours. The conversion was greater than 99%. A stable fluid aqueous dispersion was obtained. The bulk viscosity of the aqueous dispersion was about 1300 cps showing preferable fluidity as measured with a Brookfield Viscometer, No. 4 spindle, 30 rpm at 25° C. The aqueous dispersion was dissolved to give a SV of 2.1 cps. This Example demonstrates that, despite Comparative Example 1 of EP 0 525 751 A1, an aqueous dispersion may be formed when the first polymer contains recurring units of the propyl chloride quaternary salt of dimethylaminoethylacrylate.

EXAMPLE 179

An aqueous dispersion was prepared in a similar manner to Example 40 except that the first polymer composition was AMD/DEAEA.DMS/DMAEA.MeCl (60/30/10 mole). The aqueous dispersion had a bulk viscosity of about 3,600 cps (No. 4 spindle, 30 rpm at 25° C.) and a SV of 2.64 cps.

EXAMPLE 180

An aqueous dispersion was prepared in a similar manner to Example 40 except that the first polymer composition was AMD/DEAEA.DMS/DMAEA.MeCl (60/25/15 mole). The aqueous dispersion had a bulk viscosity of about 1,000 cps (No. 4 spindle, 30 rpm at 25° C.) and a SV of 2.87 cps.

EXAMPLES 181–261

The performance of aqueous dispersions of the instant invention was determined by measuring free drainage rate and cake solids from dewatered sludge as follows: Two hundred grams of sewage sludge from a municipal waste treatment plant were weighed into each of a series of jars. Solutions of the aqueous dispersions and of W/O, a commercial water-in-oil emulsion control (60/40 mole % AMD/DMAEA.MeCl), were prepared so that the concentration of the polymer was about 0.2%. Various doses of the polymer solutions were intermixed with the sludge samples and agitated at 500 rpm for 10 seconds (500 rpm/10 seconds) or at 1000 rpm for 5 seconds (1000 rpm/5 seconds) with an overhead mixer. The resultant aqueous mixture of flocculated sludge was dewatered by pouring it into a Buchner funnel containing a 35 mesh stainless steel screen; the free drainage was determined by measuring the milliliters of filtrate collected in 10 seconds. Cake solids were determined by drying the pressed sludge at 105° C. The results are shown in Table 15, with each polymer identified by previous Example No., free drainage in units of milliliters/10 seconds, mixing in rpm/seconds, dosage in units of pounds of polymer per ton of dry sludge, and cake solids as a weight percent of dry solids in wet cake. The notation "N/A" in the Table means that an accurate cake solids value could not be obtained. These Examples show that the performance of the aqueous dispersions of the instant invention is substantially equivalent or superior to a comparable commercial product.

TABLE 15

| No. | Polymer | Mixing | Dosage | Free Drainage | Cake Solids (%) |
|---|---|---|---|---|---|
| 181 | 102 | 500/10 | 24.4 | 137 | 17.3 |
| 182 | 102 | 500/10 | 26.7 | 140 | 16.9 |
| 183 | 102 | 500/10 | 28.9 | 128 | 17.1 |
| 184 | 103 | 500/10 | 20 | 138 | 15.8 |
| 185 | 103 | 500/10 | 22.2 | 155 | 16.5 |
| 186 | 103 | 500/10 | 24.4 | 158 | 16.5 |
| 187 | 103 | 500/10 | 26.7 | 162 | 15.7 |
| 188C | W/O | 500/10 | 24.4 | 112 | 15.0 |
| 189C | W/O | 500/10 | 26.7 | 122 | 15.6 |
| 190C | W/O | 500/10 | 28.9 | 114 | 15.2 |
| 191 | 102 | 1000/5 | 20.2 | 142 | 15.5 |
| 192 | 102 | 1000/5 | 22.2 | 145 | 15.8 |
| 193 | 102 | 1000/5 | 26.7 | 140 | 15.3 |
| 194 | 103 | 1000/5 | 24.4 | 130 | 15.7 |
| 195 | 103 | 1000/5 | 26.7 | 138 | 15.8 |
| 196 | 103 | 1000/5 | 28.9 | 145 | 15.2 |
| 197C | W/O | 1000/5 | 22.2 | 112 | 16.0 |
| 198C | W/O | 1000/5 | 24.4 | 120 | 16.2 |
| 199C | W/O | 1000/5 | 26.7 | 110 | 15.7 |
| 200 | 9 | 500/10 | 23 | 144 | 16.6 |
| 201 | 9 | 500/10 | 27.2 | 160 | 17.0 |
| 202 | 9 | 500/10 | 31.4 | 140 | 17.1 |
| 203 | 179 | 500/10 | 23 | 144 | 17.0 |
| 204 | 179 | 500/10 | 27.2 | 153 | 17.6 |
| 205 | 179 | 500/10 | 31.4 | 152 | 17.4 |
| 206 | 180 | 500/10 | 23 | 100 | 16.9 |
| 207 | 180 | 500/10 | 27.2 | 130 | 16.8 |
| 208 | 180 | 500/10 | 31.4 | 125 | 17.1 |
| 209C | W/O | 500/10 | 23 | 99 | 14.9 |
| 210C | W/O | 500/10 | 27.2 | 92 | 15.2 |
| 211 | 9 | 1000/5 | 25.1 | 96 | 17.6 |
| 212 | 9 | 1000/5 | 29.3 | 97 | 18.0 |
| 213 | 9 | 1000/5 | 31.4 | 93 | 17.9 |
| 214 | 179 | 1000/5 | 29.3 | 107 | 17.7 |
| 215 | 179 | 1000/5 | 31.4 | 92 | 18.4 |
| 216 | 179 | 1000/5 | 35.6 | 104 | 18.7 |
| 217 | 180 | 1000/5 | 25.1 | 84 | 16.9 |
| 218 | 180 | 1000/5 | 29.3 | 92 | 17.9 |
| 219 | 180 | 1000/5 | 31.4 | 136 | 17.1 |
| 220 | 180 | 1000/5 | 35.6 | 104 | 17.1 |
| 221C | W/O | 1000/5 | 25.1 | 110 | 16.1 |
| 222C | W/O | 1000/5 | 29.3 | 112 | 16.5 |
| 223C | W/O | 1000/5 | 31.4 | 108 | 16.8 |
| 224 | 44 | 500/10 | 22.1 | 140 | 17.5 |
| 225 | 44 | 500/10 | 24.5 | 138 | 17.0 |
| 226 | 44 | 500/10 | 27 | 139 | 17.4 |
| 227 | 44 | 1000/5 | 22.1 | 120 | 19.0 |
| 228 | 44 | 1000/5 | 25.8 | 117 | 19.3 |
| 229 | 44 | 1000/5 | 29.4 | 104 | 19.5 |
| 230C | W/O | 500/10 | 18.4 | 108 | NA |
| 231C | W/O | 500/10 | 22.1 | 110 | NA |
| 232C | W/O | 500/10 | 25.8 | 66 | NA |
| 233C | W/O | 1000/5 | 22.1 | 128 | 17.9 |
| 233C | W/O | 1000/5 | 25.8 | 102 | 17.6 |
| 235 | 61 | 500/10 | 16.9 | 130 | 17.2 |
| 236 | 61 | 500/10 | 18.6 | 140 | 18.0 |
| 237 | 61 | 500/10 | 21.9 | 130 | 17.3 |
| 238 | 67 | 500/10 | 15.2 | 80 | 16.8 |
| 239 | 67 | 500/10 | 16.9 | 105 | 17.8 |
| 240 | 67 | 500/10 | 18.6 | 126 | 18.2 |
| 241C | W/O | 500/10 | 15.2 | 116 | 16.2 |
| 242C | W/O | 500/10 | 16.9 | 116 | 15.6 |
| 243C | W/O | 500/10 | 18.8 | 82 | 15.4 |

TABLE 15-continued

| No. | Polymer | Mixing | Dosage | Free Drainage | Cake Solids (%) |
|---|---|---|---|---|---|
| 244 | 140 | 500/10 | 26.5 | 138 | 18.0 |
| 245 | 140 | 500/10 | 29.4 | 140 | 18.5 |
| 246 | 140 | 500/10 | 32.4 | 130 | 18.2 |
| 247 | 140 | 1000/5 | 29.2 | 118 | 17.8 |
| 248 | 140 | 1000/5 | 32.4 | 129 | 18.4 |
| 249 | 140 | 1000/5 | 35.7 | 137 | 19.0 |
| 250 | 142 | 500/10 | 26.5 | 120 | 16.9 |
| 251 | 142 | 500/10 | 29.4 | 142 | 17.2 |
| 252 | 142 | 500/10 | 32.4 | 127 | 17.1 |
| 253 | 142 | 1000/5 | 25.9 | 120 | 17.3 |
| 254 | 142 | 1000/5 | 29.2 | 140 | 17.8 |
| 255 | 142 | 1000/5 | 32.4 | 138 | 18.3 |
| 256C | W/O | 500/10 | 14.7 | 76 | 14.0 |
| 257C | W/O | 500/10 | 17.6 | 114 | 14.8 |
| 258C | W/O | 500/10 | 20.6 | 105 | 14.8 |
| 259C | W/O | 1000/5 | 22.7 | 104 | 16.8 |
| 260C | W/O | 1000/5 | 25.9 | 134 | 16.3 |
| 261C | W/O | 1000/5 | 29.2 | 113 | 16.7 |

C: Comparative
W/O: Commercially available water-in-oil emulsion copolymer of acrylamide and DMAEA.MeCl (60/40 mole %)

EXAMPLES 262–263

The performance of the aqueous dispersions of Examples 118 and 121 is determined by measuring free drainage rate and cake solids from dewatered sludge by following the procedure of Examples 181–261. Similar results are obtained.

EXAMPLE 264

A solution of the spray-dried polymer of Example 174 is prepared so that the concentration of the polymer is about 0.2%. The performance is determined by measuring free drainage rate and cake solids from dewatered sludge by following the procedure of Examples 181–261. Similar results are obtained.

EXAMPLES 265–277

Solutions of the aqueous dispersions and spray-dried polymers of Examples 9, 44, 61, 67, 102, 103, 118, 121, 140, 142, 174, 179, and 180 are prepared so that the concentration of the polymer is about 0.2%. The performance is determined by measuring free drainage rate by following the procedure of Examples 181–261, except that a 1% suspension of paper solids is dewatered instead of sewage sludge. Similar results are obtained.

EXAMPLES 278–293

Aqueous admixtures are prepared by intermixing the aqueous dispersions of Examples 157–172 with water so that the concentration of the polymer is about 0.2%. The performance is determined by measuring free drainage rate by following the procedure of Examples 181–261, except that a 1% suspension of paper solids is dewatered instead of sewage sludge. Similar results are obtained.

We claim:

1. A process for producing substantially dry water-soluble or water-swellable vinyl-addition polymer particles comprising (a) spray-drying a vinyl-addition polymer-containing aqueous dispersion into a gas stream with a residence time of about 8 to about 120 seconds and at an outlet temperature of about 70° C. to about 150° C. and (b) collecting resultant polymer particles.

2. A process as claimed in claim 1 wherein said vinyl-addition polymer-containing aqueous dispersion is comprised of
(a) a first cationic water-soluble or water-swellable polymer; and
(b) at least one second water-soluble polymer different from said first polymer; and
(c) a kosmotropic salt; and
(d) a chaotropic salt,
wherein the amounts of said (b), said (c) and said (d) are such that a homogeneous composition is obtained in the absence of said (b).

3. A process as claimed in claim 2 wherein said first polymer is water-soluble.

4. A process as claimed in claim 2 wherein said second polymer is cationic.

5. A process as claimed in claim 2 which further comprises agglomerating said polymer particles.

6. A process as claimed in claim 1 wherein said vinyl-addition polymer-containing aqueous dispersion is comprised of
(a) a first cationic water-soluble or water-swellable polymer; and
(b) at least one second water-soluble polymer different from said first polymer; and
(c) a kosmotropic salt; and
(d) an anionic organic salt,
wherein the amounts of said (b), said (c) and said (d) are such that a homogeneous composition is obtained in the absence of said (b).

7. A process as claimed in claim 6 wherein said first polymer is water-soluble.

8. A process as claimed in claim 6 wherein said second polymer is cationic.

9. A process as claimed in claim 6 which further comprises agglomerating said polymer particles.

10. A process as claimed in claim 1 wherein said vinyl-addition polymer-containing aqueous dispersion is comprised of
(a) a discontinuous phase containing polymer that is comprised predominately of a first cationic water-soluble or water-swellable polymer having at least one recurring unit of the formula (I),

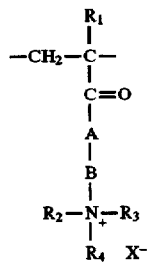

wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is a methyl, ethyl or propyl group, X is a counterion, and $R_2$, $R_3$, and $R_4$ together contain a total of at least 4 carbon atoms; and
(b) at least one second water-soluble polymer different from said first polymer.

11. A process as claimed in claim 10 wherein said first polymer is water-soluble.

12. A process as claimed in claim 10 wherein said second polymer is cationic.

13. A process as claimed in claim 10 which further comprises agglomerating said polymer particles.

14. A process as claimed in claim 1 wherein said vinyl-addition polymer-containing aqueous dispersion is comprised of
(a) a first cationic water-soluble or water-swellable polymer having at least one recurring unit of the formula (I),

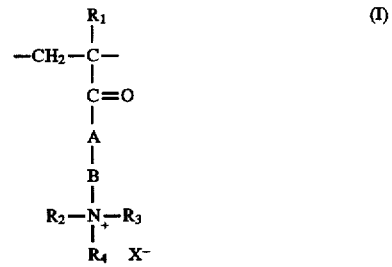

wherein $R_1$ is H or $CH_3$, A is O or NH, B is an alkylene or branched alkylene or oxyalkylene group having from 1 to 5 carbons, $R_2$ is a methyl, ethyl, or propyl group, $R_3$ is a methyl, ethyl, or propyl group, $R_4$ is an alkyl or substituted alkyl group having from 1 to 10 carbons, or an aryl or substituted aryl group having from 6 to 10 carbons, X is a counterion, and $R_2$, $R_3$, and $R_4$ together contain a total of at least 4 carbon atoms; and
(b) at least one second water-soluble polymer different from said first polymer,
wherein a homogeneous composition is obtained in the absence of said (b).

15. A process as claimed in claim 14 wherein said first polymer is water-soluble.

16. A process as claimed in claim 14 wherein said second polymer is cationic.

17. A process as claimed in claim 14 which further comprises agglomerating said polymer particles.

18. A process for producing substantially dry water-soluble or water-swellable vinyl-addition polymer particles comprising (A) spray-drying a vinyl-addition polymer-containing aqueous dispersion into a gas stream with a residence time of about 8 to about 120 seconds and at an outlet temperature of about 70° C. to about 150° C. and (B) collecting resultant polymer particles, wherein said vinyl-addition polymer-containing aqueous dispersion is comprised of
(1) a discontinuous phase containing polymer that is comprised predominately of a first cationic water-soluble or water-swellable polymer having (a) from about 5 to about 55 mole % recurring units of the methyl chloride or dimethylsulfate quaternary salt of diethylaminoethylacrylate, (b) from about 45 to about 90 mole % acrylamide recurring units, and (c) from 0 to about 35 mole % recurring units of the methyl chloride or dimethylsulfate quaternary salt of dimethylaminoethylacrylate, based on total moles of recurring units in said first polymer; and
(2) at least one second, predominately cationic, water-soluble polymer different from said first polymer; and
(3) a salt selected from the group consisting of ammonium sulfate, sodium sulfate and mixtures thereof;
wherein said aqueous dispersion contains from about 10 to about 30%, by weight, of said first polymer, about 2 to about 8%, by weight, of said second polymer, and about 10 to about 25%, by weight, of said salt, based on total weight.

19. A process for producing substantially dry water-soluble or water-swellable vinyl-addition polymer particles comprising (A) spray-drying a vinyl-addition polymer-containing aqueous dispersion into a gas stream with a residence time of about 8 to about 120 seconds and at an outlet temperature of about 70° C. to about 150° C. and (B) collecting resultant polymer particles, wherein said vinyl-addition polymer-containing aqueous dispersion is comprised of (1) a discontinuous phase containing polymer that is comprised predominately of a first cationic water-soluble or water-swellable polymer having (a) from about 5 to about 55 mole % recurring units of the methyl chloride, or dimethylsulfate quaternary salt of diethylaminoethylacrylate, (b) from about 45 to about 90 mole % acrylamide recurring units, and (c) from 0 to about 35 mole % recurring units of the methyl chloride, benzyl chloride, or dimethylsulfate quaternary salt of dimethylaminoethylacrylate, based on total moles of recurring units in said first polymer; and (2) at least one second, predominately cationic, water-soluble polymer different from said first polymer; and (3) a salt selected from the group consisting of ammonium sulfate, sodium sulfate and mixtures thereof;

wherein said aqueous dispersion contains from about 10 to about 30%, by weight, of said first polymer, about 2 to about 8%, by weight, of said second polymer, and about 10 to about 25%, by weight, of said salt, based on total weight; and wherein a homogeneous composition is obtained in the absence of said (2).

20. A process as claimed in claim 1 wherein said outlet temperature is less than 100° C.

* * * * *